United States Patent

Olcelli et al.

[15] 3,686,632

[45] Aug. 22, 1972

[54] TAPE PROGRAMMER FOR OPERATING MACHINES OF VARIOUS TYPES, IN PARTICULAR OPERATIONAL MACHINES AND TEST MACHINES

[72] Inventors: Gian Battista Olcelli, Milan; Sergio Caliari, Sesto San Giovanni; Guiseppe Montessori, Milan, all of Italy

[73] Assignee: Pirelli S.p.A., Milan, Italy

[22] Filed: June 2, 1970

[21] Appl. No.: 42,691

[52] U.S. Cl. ..........................340/147 R, 340/163 R

[51] Int. Cl. ..............................................H04q 9/00

[58] Field of Search.......................................340/147

[56] References Cited

UNITED STATES PATENTS

| | | | |
|---|---|---|---|
| 3,274,553 | 9/1966 | Oya | 340/147 |
| 3,291,919 | 12/1966 | Robitaille | 340/147 |
| 3,351,907 | 11/1967 | Cordes | 340/147 |

*Primary Examiner*—Harold I. Pitts
*Attorney*—Fleit, Gipple & Jacobson

[57] ABSTRACT

A tape programmer which comprises a tape reader, a central unit, a plurality of peripheral units and a like number of actuators for the movable members of the machine. The central unit receives, decodes and sends to the peripheral units some of the information transmitted by the reader, eventual information transmitted by the peripheral units with respect to the state of the movable members connected to them and eventual information transmitted to it by first manual controls. Furthermore, the central unit authorizes second manual controls upon the reception of other information transmitted by the tape reader or particular information transmitted by said first manual controls.

21 Claims, 10 Drawing Figures

TAPE PROGRAMMER FOR OPERATING MACHINES OF VARIOUS TYPES, IN PARTICULAR OPERATIONAL MACHINES AND TEST MACHINES

This invention relates to a programmer which, according to that read on a punched tape, controls the carrying out of a determined sequence of operations by the machine, for example an operational machine or a test machine, to which it is applied.

The programmer comprises a reader for the information contained on the tape, a central unit and a plurality of peripheral units which furnish to a like number of actuators signals for operating the movable members of the machine, said central unit receiving, decoding and sending to the peripheral units some of the information transmitted by the reader, and further controlling the advancement and arrest of the tape as a function of the information transmitted by the reader, eventual information transmitted by the peripheral units relative to the state of the movable members connected to them, and eventual information transmitted to it by first manual controls, and finally authorizing second manual controls following reception of other information transmitted by the reader or particular information transmitted by first manual controls.

A first member contained in the central unit comprises a decoder which receives the coded information read from the tape by the reader, decodes it and sorts it into a plurality of channels. The channels relative to the information of movement of movable members (or also of variations of physical states, for example the introduction of fluid into an expandable chamber) carry the information to the peripheral units concerned, which memorize it and transmit it to the corresponding actuators. Channels are also provided which carry signals of arrest of the tape to a member, called "reader control," otherwise generating at constant recurrence signals of advancement of the tape and of reading of the information, off the tape as it is occurring.

These arrest signals may give rise either to a momentary arrest, with the time of arrest determined by information contained on the tape or determined by the time necessary for the attainment of particular conditions by the movable members which were controlled following the previously read information, or a final arrest. In the first case of momentary arrest the corresponding information acts on a circuit, called "timed wait," which acts in its turn on the "reader control" in such a manner as to block the relative emission of reader control signals for a predetermined time. In the second case of momentary arrest the corresponding information acts instead on a circuit called "wait executed," which blocks in its turn the emission of signals by the "reader control" until at the "wait executed" inlet, the simultaneous presence of a certain number of signals coming from the peripheral units (called "execution signals") occurs, and which give indication that the previously imparted orders have been carried out. In the case of final arrest, the relative information ("-stop tape") arrives instead directly at the "reader control" and causes the arrest of the tape for an unlimited time, i.e., until a successive start signal. A final arrest can however be caused also by signals coming from peripheral units, which indicate that one of the members being made to move would interfere with another member out of place, so compromising the safety of the machine. These signals act on an "alarm" circuit which in its turn acts on the "reader control" so as to block the corresponding emission of control signals.

The central unit is further provided with manual control members which allow the tape to be arranged in a particular position in order to carry out a determined operation, the starting and reading of the tape and its arrest. The signals emitted by means of all these manual control members act on the "reader control," in such a manner as to unblock or block it according to the circumstances.

Members are also provided which permit manual control of the various operations which the machine has to carry out, i.e., by excluding the tape and the central unit. These members are connected to the "reader control" in such a manner as to be authorized only when this is blocked by the effect of the reception of one of said final arrest signals, i.e., when the tape is at rest permanently, and act in such a manner as to furnish to the peripheral units the information which is no longer withdrawn from the tape.

The peripheral units merit particular mention. They are all substantially equal and are subdivided essentially into a part of elaboration and of memory and a part which functions as a power switch. The first part receives the information from the central unit and, if contrary signals do not arrive from other peripheral units or from other external members, memorizes it and transmits signals to the second part which cause it to switch on and to emit control signals for the corresponding actuator. The peripheral units also receive signals from limiting members, signals which the peripheral units transmit in their turn to the central unit (execution signals).

When however a member of the machine is capable of being moved in two opposite directions (forward and backward), it is provided with two actuators, one for the movement in one direction and the other for the movement in the other direction. Each actuator is in its turn controlled by a peripheral unit similar to those previously described, and when it is desired to position the said member in one or more intermediate positions between the two extremities between which said member can be moved, a so called positioning unit is disposed between the central unit and the two peripheral units in such a manner as to receive the information transmitted by the central unit and distribute it to one or other of the two peripheral units relative to the two movements of the movable member, according to whether the position indicated by the information is displaced in one direction or the other with respect to that in which the movable member in question is situated at that moment. The positioning units function thus when provided with signals from limiting members which give information regarding the actual position of the movable member concerned. If, having chosen a certain reference direction, the given command asks for movement towards a limit situated more forward, the peripheral unit relative to the "forward" movement will be concerned, and in the contrary case that relative to "backward" movement will be concerned.

If required, the programmer according to the invention can further be provided with one or more peripheral units which receive and store information of digital type contained on the tape, which refers to desired levels for the controlled members. These levels are compared with the actual levels of the controlled member and the difference thus obtained causes advancement of the member itself until the difference is eliminated, i.e., up to the level read off the tape. In this manner the controlled members can be positioned in the positions ordered by the tape without concerning the positioning units described above.

The main advantage of the programmer thus described lies in the fact that it is of very flexible use and is adaptable to programs and machines of different types and in particular to any type of operational machine. It is evident that on passing from one machine to another it is simply necessary to change the tape and actuators and to vary the peripheral units and any positioning units, but only in number and disposition. The reader, the central unit and the internal structure of the peripheral and positioning units remain unchanged. This modularity of members which comprise the programmer makes it particularly flexible and adaptable to different machines and programs.

A programmer of this type further permits complete automation of the operation, with the exception of any operations which are carried out exclusively by hand because of the lack of machinery for the purpose (fixing the tread in tire machines for example), and further renders possible the consecutive carrying out of a number of working cycles without changing the tape.

If a circular tape is used, the machine can work cyclically without even having to reset the tape.

These and further advantages offered by the programmer according to the invention will be evident from the description which follows of a preferred embodiment. In this description, by way of example, reference is made to the accompanying drawings in which.

Figure 1:
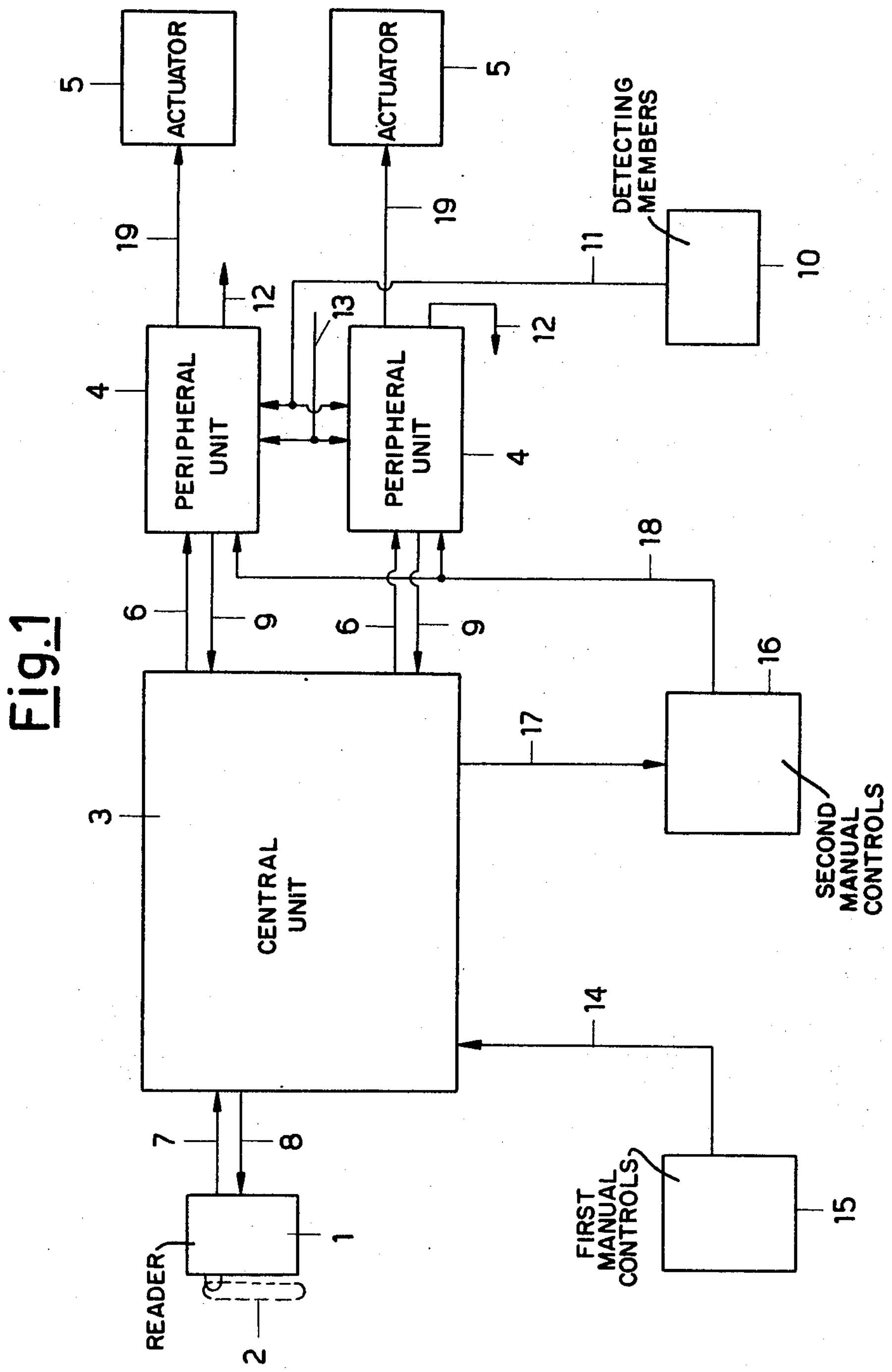
FIG. 1 is a very general block diagram of a programmer according to the invention.

In its more general form (FIG. 1) the programmer according to the invention comprises a reader 1 which withdraws from a tape 2 the information contained on it, a central unit 3 and a plurality of peripheral units 4 which furnish to a like number of actuators 5 signals 19 for operating the movable members of the machine to which the programmer is applied.

The central unit 3 receives, decodes and sends to the peripheral units (signals 6) the information (signals 7) transmitted by the reader and further controls the advancement and arrest of the tape with respect to the reader (signals 8) as a function of the information transmitted by the reader (signals 7) and any information (signals 9) transmitted by the peripheral units relative to the state of the movable members connected to them. The information relative to the state of said movable members is furnished to the peripheral units by members connected to the machine, such as for example limit switches, pressure switches, etc. In FIG. 1 they are shown together in a block 10 and the information transmitted by them is indicated by means of signals 11. It should also be observed that the peripheral units are connected together so that they are informed of each others state. FIG. 1 shows the information 12 leaving the individual peripheral units and that 13 arriving.

Signals 14 can arrive at the central unit from a block 15 which indicates a group of manual control members which, according to that which is operated, permit a point on the tape to be selected from which to commence the reading, to start the reading of the tape and also to cause the arrest of the tape. The arrest of the tape, whether caused by such a manual control or caused by information read off the tape, comprises the authorization of a part or of all the manual control members included in a block 16 (the concept will be explained hereinafter), by means of which the movements of the various movable members of the machine can be controlled. FIG. 1 shows the signals 17 by which the central unit authorizes the manual controls of the block 16 and the signals 18 produced by said manual controls.

Figure 2:
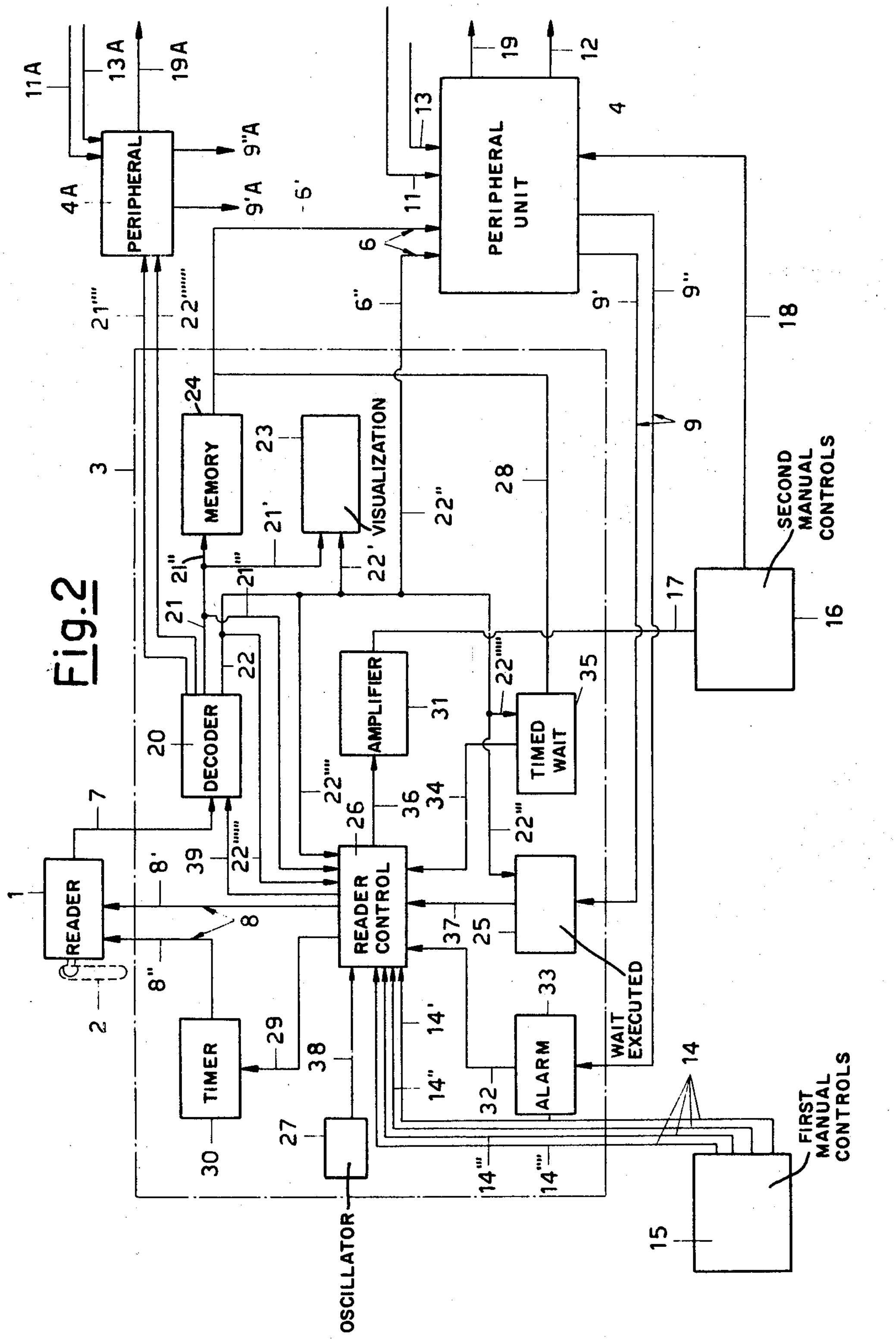
FIG. 2 is a more detailed block diagram of said programmer.

One embodiment of the central unit 3 is shown in FIG. 2. In order to better describe its structure and operation some considerations will be made regarding the various possible types of program and codes of the punched tape. The programs and codes can be of any type, but in order to clarify the description it will be supposed that a tape of the type described hereinafter is used. It will firstly be subdivided into sections, i.e., the perforations will be collected into a number of groups, each furnished with its own address. This subdivision is due to the fact that the operational cycle of a machine can be subdivided into a number of operational blocks each one represented by a succession of movements of the various movable members of the machine which together determine an operation carried out on the piece being worked, for example rolling the tread or turning the sides in a tire making machine such as that described in the Italian Pat. No. 717,610 or that described in the Italian Pat. No. 733,825, both in the name of the same applicant as that of the present application.

Each of said operational blocks is provided, as stated, by its own address represented for example by a letter joined to a number (it could however be represented by the joining of two letters or two numbers, the representation having only a symbolic value). These block addresses are punched on the tape in the form of two perforations (one for the letter and one for the number) disposed at the beginning of each group of perforations and serve essentially, as will be seen better hereinafter, for the manual selection of the various operational blocks.

In a like manner the information relative to each individual function is also coded (for example the movement of a movable member or the inflation of a chamber) included in each operational block. Thus each function can be indicated in code by the coupling of a number and a letter and the relative information is punched on the tape in the form of two successive perforations. Various information can also be punched on the tape, such as for example that relating to the momentary or final arrest of the tape ("call for wait executed," "call for timed wait," "stop tape"). This information can be coded by a single letter or particular character and is punched as a single perforation on the tape in such a manner as to differentiate it from that relative to the functions which are carried out by the movable members of the machine.

Finally the tape contains information relative to levels of positioning of the controlled members, the purpose of which will appear evident hereinafter. It is supposed that such information will consist of a letter and three numbers (indicating level) coded in binary code.

This description of the type of program and code used serves exclusively in order to better describe and better understand the structure and operation of the central unit of the programmer according to the invention. It must however be understood that any changes of program do not give rise to changes in the circuits of the programmer, while any changes in code will only give rise to variation in the decoding circuits.

In the following it will be supposed for clarity of description that the addresses of the block are indicated by coupling the letter N with any number, i.e., N0, N1, N2 and so on, and that the various information included in each operational block is indicated by couples of type 1A, 3C, 4B and so on, if relative to a function to be carried out on the machine, and by simple letters or particular characters if relative to particular information such as the call for wait executed (?), the call for timed wait (T̲) and stop tape (/̲).

Having described the type of program and code which it is supposed will be used, the central unit of FIG. 2 will now be considered. This comprises a decoder 20 which receives signals 7 transmitted by the reader and possesses different outlets for numbers, letters and the particular characters mentioned.

FIG. 2 shows by means of a single outlet 21 the outlets relative to numbers and with a single outlet 22 the outlets relative to letters and characters.

Each of these outlets is branched into a number of directions relative to the transmission of the different information. Thus the letter and number relative to a block address are channelled along the directions 22' and 21' respectively towards a block 23 called "-visualization," i.e., a block whose outlet consists of a luminous signal which warns the operator of the beginning of a new operational block. In a like manner the information relative to each block address as it arrives is transmitted along the directions 22'''''' and 21''' to a block 26, to inform it that the various addresses of the block have been reached. The numbers and letters which coupled together in pairs which bring the controls to the position for carrying out the functions required by the movable members of the machine are however transmitted along the directions 21'' and 22'' respectively, the path 21'' carrying numbers towards a memory 24 which maintains its own exit signals 6' unaltered during the interval between one reading and another so as to permit the signals 6' relative to the numbers to await the corresponding signals 6'' relative to the letters, which instead arrive directly at the peripheral unit concerned along the path 22''. The coupled signals 6' and 6'' in fact constitute the signals 6 which, as explained with reference to FIG. 1, are sorted by the central unit 3 towards the various peripheral units 4. It should be noted that in FIG. 2 a single peripheral unit is shown which would seem to receive all the signals transmitted by the central unit. The peripheral units however can be of any number and each of them would absorb a part of the signals channelled along the paths 21'' and 22''.

On receiving the pair of signals 6'-6'' the peripheral unit concerned, in the absence of any contrary signals from the machine or other peripheral units (signals 11 and 13 respectively), liberates a signal 19 which operates the actuator connected to it and a signal 12 which informs the other peripheral units as to the condition of the unit which emitted it. When the function controlled has been brought to an end, the block 10 of members situated in the machine transmits a signal 11 which warns that the controlled function has been carried out and causes the emission by the peripheral unit of an execution signal 9'. The presence of this and any other analogous signals at the inlet of a block 25 called "wait executed" permits unblocking by means of signals 37 (or avoids blocking according to whether a call executed signal ?̲ has already arrived along the path 22''' or is in the process of arriving) of a block 26, called "reader control," which, controlled by an oscillator 27 which emits signals 38 at a constant rate, controls the advancement of the tape (signals 8' transmitted to the reader until this causes the relative advancement of the tape) and the reading of the various pieces of information which follow one after the other on the tape (signals 29 acting on a timer 30 so as to make it emit reading impulses 8''). The reader control 26 can be blocked both by the call executed signals and by any alarm signals 32 emitted by a block 33 following emission by at least one peripheral unit of signals 9'' which indicate the presence of at least one member out of place, or rather in a dangerous position.

Other signals which cause blocking of the reader control and hence the arrest of the tape are the "stop tape" information (/̲) contained on the tape and arriving directly at the reader control along the path 22'''', the signals 34 emitted by a "timed wait" block 35 following the arrival of information T̲ along the path 22'''''(signals 34 which block the reader control for a time proportional to the number, signals 28, immediately preceding such information) and finally the signals 14''' and 14'''' emitted by the block 15 by operation of the two manual members controlling two different types of arrest of the tape. The signals, indicated analogously by the reference numerals 14' and 14'', emitted by the operation of any one of the preselection manual members and a manual member for starting the work respectively contained in the block 15, act instead on the reader control in such a manner as to bring the tape to a position corresponding to the beginning of an operational block, and to start the reading of the information contained on the tape respectively. The signals 14' also cause unblocking of the block 33 if the programmer has been blocked by an alarm signal 22. The arrival of a signal 14' at the reader control causes the emission by it of a signal 39 which arranges the decoder for the block of all information with the exception of that relative to the preselected address. The blocking of the reader control caused by the "stop tape" signals and the signals 14''' and 14'''' cause the emission by the reader control of signals 36 which, amplified in an amplifier 31, are transformed into signals 17 for authorizing the manual controls contained in the block 16. It must however be noted that while the signals 14''' (called hereinafter "manual" signals) authorize all the manual controls contained in the block 16, the "stop tape" signals and the signals 14'''' (called hereinafter "arrest tape" signals) authorize only a small part of the manual controls contained in the block 16. Consequently in the first case it is necessary to carry out a new preselection before recommencing reading of the tape (it is in fact possible that the various operations carried out by manual control may have upset the machine), while in the second case as only a few determined movable members have been moved manually and as the machine has thus not been upset, this preselection is not necessary and the reading of the tape can be recommenced from where it was interrupted. The blocking of the reader control caused by the other signals of "call executed," "call timed" and "alarm," do not however authorize these manual controls.

The operation of the programmer as shown in FIG. 2 is the following: with the machine at rest before the beginning of a working cycle, the push button (or other manual control member) relative to the preselection of a determined operational bloc, in this case the first, is operated. Operating this preselection push button causes the emission of a signal 14' which makes the reader control the advancement of the tape up to the address of the first operational block, for example until the address N0, and arranges the decoder 20, by means of a signal 39, to block all the information read except that relative to the preselected address. The reader reads the address N0, passes it to the decoder 20 contained in the central unit and this sends the letter N and the number 0 to the visualization block 23 along the paths 22' and 21' and, by way of the paths 22'''''' and 21''', informs the reader control that the tape has reached the desired position. The reader control is thus ready for the start and a signal, preferably luminous, warns the operator that the programmer is ready to make the machine start its operations and is awaiting the order to start.

When this order is imparted by operating the "start working" push button, also called "automatic," included in the block 15, the signal 14'' from it acts on the reader control in such a manner that under the guidance of the oscillator 27, it begins to emit at a constant rate the signals 8' for advancing the tape and signals 29 which are transformed by the timer 30 into impulses 8'' for reading the information contained on the tape. As it is supposed that each piece of information relative to functions to be carried out by the movable members of the machine is indicated by two adjacent perforations, one having a number and the other a letter as symbols, the reader reads and transmits to the central unit first a number and then a letter (naturally in the form of signals, the number and letter being merely of symbolic value). The decoder 20 emits the number read along one of the paths 21'', which makes the corresponding memory 24 rise so that the number memorized is present at its outlet. The signal 6' thus obtained does not cause any change in the state of the peripheral unit concerned, in that as will be seen better hereinafter the peripheral units can change only when both the signals 6' and 6'' of each pair of perforations indicating information are present at their inlet, and even in this case only if there is no contrary information in the form of signals 11 and 13. The successive reading and transmission to the decoder 20 of the letter coupled to the preceding number causes the arrival of a signal 6'' which combines with the signal 6' previously memorized in such a manner as to make the peripheral unit concerned change its state and make it emit a signal 19, providing there are no contrary indications as previously stated, for controlling the actuator which operates the movable member to which the information read is directed.

Guided by the oscillator 27, the reader control 26 continues to emit signals of advancement and reading of the tape because of which the various pieces of information succeed each other at a constant rate at the inlet of the central unit and are distributed by the decoder 20 towards the various peripheral units concerned. All the controlled functions are realized in succession by the various movable members of the machine without any interruption unless one of them because of a badly carried out movement becomes located in a position which causes obstruction to other movable members, thus creating a risk to the proper operation of the machine. In this case a signal arrives at the peripheral unit concerned with the movement to be carried out, from the block 10 (signal 11) or from the peripheral unit relative to the member out of place (signal 13), this signal blocking the emission of the signal 19 relative to the movement to be carried out and causing emission by the former peripheral unit of an alarm signal 9'' which acts on the block 33 so as to make it emit a signal 32 for blocking the reader control. The tape stops and in order to make it start again it is necessary to remove the out of place member and once again push the "preselection" push button corresponding to the operational block which is to be repeated and then again press the "start working" push button, by which means the block 33 changes state (under the action of the signal 14'), the signal 32 is annulled, the reader control is unblocked and the advancement and reading of the tape recommence.

Otherwise the advancement and reading of the tape continue until a piece of information previously defined by the reference characters ?, T and / is read. The information ? (wait executed) arrives at the block 25 along the path 22''' and causes emission of a signal 37 which blocks the reader control. This signal 37 is cancelled only when the presence of all the required execution signals 9' are found to be present at the inlet to the block 25.

The information T (timed wait) arrives at the block 35 along the path 22''''' and causes the emission of a signal 34 which blocks the reader control for a time determined by the information contained in the signal 28, i.e., by the number which accompanies each piece of information T.

Finally the information / arrives directly at the reader control along the path 22'''' and causes the final blockage of the reader control and hence the arrest of the tape and the consequent authorization of a group of manual controls included in the block 16 because of a signal 36 emitted by the reader control and amplified and transformed into a signal 17 by the amplifier 31.

In order to restart the reader control and hence recommence the reading of the tape it is necessary to again push the "start working" push button in the block 15.

The arrest of the tape can on the other hand be caused by pushing the "arrest tape" push button in the block 15, which again authorizes only a part of the manual controls forming part of the block 16 and does not require a successive preselection, or by pushing the "manual" push button, also included in the block 15, which instead authorizes all the manual controls in the block 16 and requires the preselection of the block from which it is required to recommence the automatic cycle.

Figure 3:
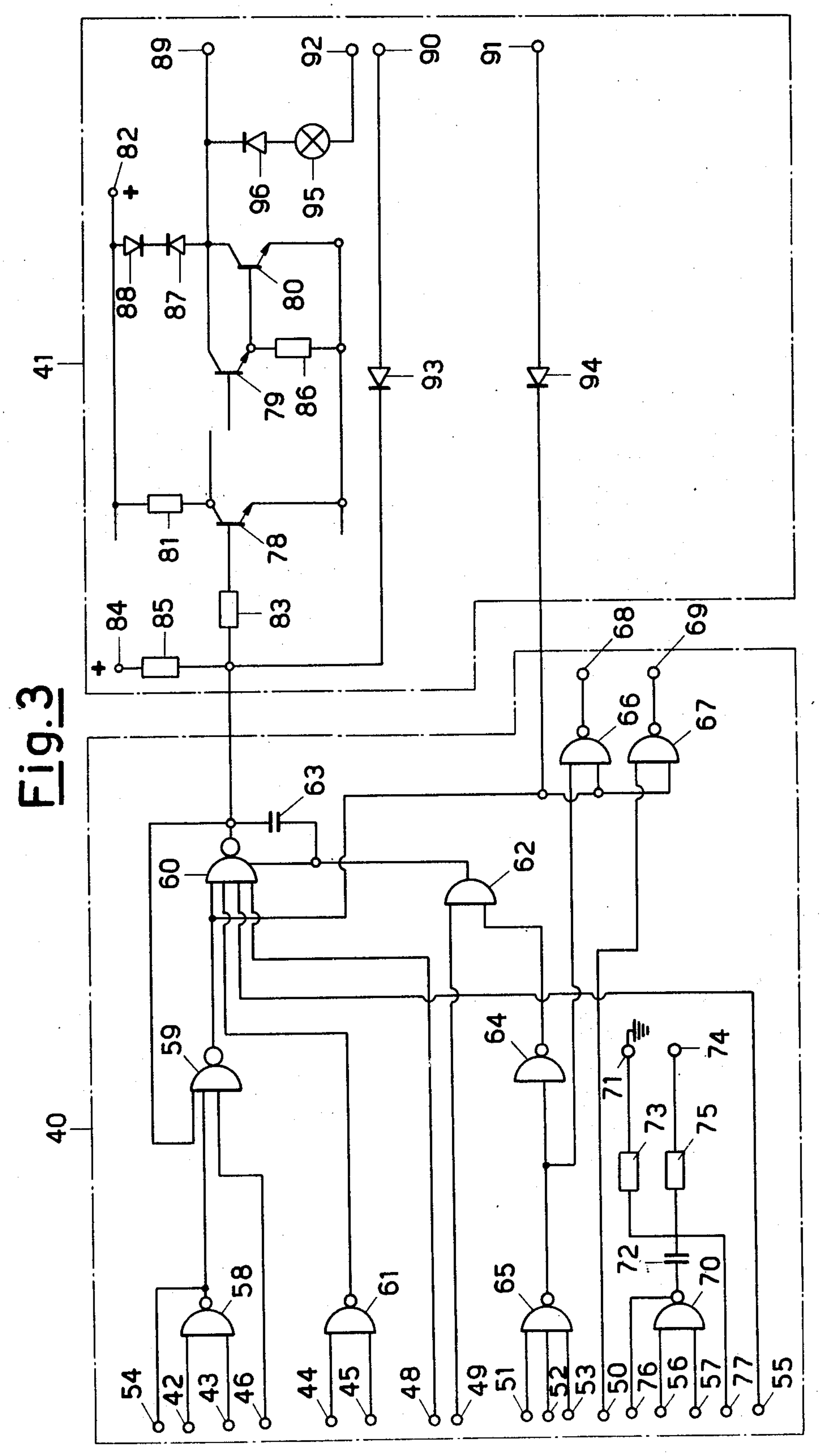
FIG. 3 is the detailed circuit diagram of a peripheral unit of said programmer.

FIG. 3 shows the detailed circuit diagram of a peripheral unit used in the programmer according to the invention and particularly suitable for a programmer having a central unit functioning with a code based on coupling a single letter with a single number, simple circuit modifications however being sufficient to render this peripheral unit usable in connection with a central unit operating with a different code. However for simplicity and clarity of description, a programmer functioning with a code based on a single letter and a single number will still be considered, both now and hereinafter. It must however be remembered that the structure and operation of the peripheral units shown in FIG. 3 should be considered purely indicative, the peripheral unit being able to be modified in various ways without leaving the inventive concept.

With reference to FIG. 3, the peripheral unit shown is subdivided into a first part 40 functioning as an elaboration and memory member and a second part 41 functioning as a power switch. The inlet part 40 is provided with a plurality of inlets to which the various signals which condition the state of the peripheral unit arrive. Signals 6' and 6'' which order the peripheral unit to pass into a first stable activation or SET condition arrive at the inlets 42 and 43 respectively, signals 6' and 6'' which order the peripheral unit to pass into a second stable deactivation or RESET condition arrive at the inlets 44 and 45 respectively, signals 18 from the block 16 of manual controls which order the peripheral unit to pass into the activation condition arrive at the inlet 46, signals 18 which order the peripheral unit to pass into the deactivation condition arrive at the inlets 48 and 49, execution signals (signals 11) may arrive at the inlet 50 from one or more members which may be disposed on the machine and which warn the peripheral unit that the required functions have been carried out, signals 13 or 11 from other peripheral units or from members on the machine which guarantee against the actual interference of the movable members of the machine arrive at the inlets 51, 52 and 53, signals of "general RESET" may arrive at the inlet 55 transmitted by the central unit on applying voltage to the apparatus, and finally other signals may arrive at the inlets 56 and 57 for particular applications.

The inlets 42 and 43 are connected to the inlet of a logic member NAND 58 whose outlet is connected to an inlet of another NAND 59, other inlets of which being connected to the inlet 46 and outlet of a third NAND 60 which has an inlet connected to the outlet of the NAND 59, an inlet connected to the inlet 53, an inlet connected to the inlet 48, an inlet connected to the outlet of a NAND 61 the inlet of which is connected to the inlets 44 and 45, and finally a control inlet connected directly to the outlet of NAND 62, and by way of a condenser 63 to the outlet of the NAND 60. The AND 62 has two inlets one connected to the inlet 49 and the other connected to the outlet of an inverter 64, the inlet of which is connected to the outlet of an NAND 65, whose inlets are connected to the inlets 51, 52 and 53.

The inlet part 40 of the peripheral unit in FIG. 3 comprises two NAND 66 and 67, the first of which has its inlets connected to the outlet of the NAND 59 and to the outlet of the NAND 65 while the second has its inlets connected to the outlet of the NAND 59 and to the inlet 50. The outlets 68 and 69 of the NAND 66 and 67 furnish respectively alarm signals 9'' and execution signals 9'.

The part 40 is also provided with another outlet 54 connected to the outlet of the NAND 58 and able to furnish signals to be used for deactivating any other peripheral units controlling functions in contradiction to those which the signals 6' and 6'' of the SET tape control at the inlet of the NAND 58 are intended to activate. The outlet 54 is connected to inlets of other peripheral units analogous to the inlets 48 and 49 of the peripheral unit of FIG. 3.

The part 40 is finally completed by an NAND 70 having two inlets connected to the inlets 56 and 57 and an outlet connected to a terminal 71 at zero potential or earth by way of a condenser 72 and a resistor 73, and to a terminal 74 at positive potential by way of the same condenser 72 and a resistance 75. Two outlets 76 and 77 are connected respectively to the outlet of NAND 70 and the junction point between the condenser 72 and the resistances 73 and 75, and are intended to be connected by external connections to the peripheral unit for particular applications which will be analyzed hereinafter.

The outlet part 41 of the peripheral unit of FIG. 3 comprises three transistors NPN 78, 79 and 80. The transistor 78 has its emitter connected directly to earth, its collector connected directly to the base of the transistor 79 and to a positive terminal 82 by way of a resistance 81, and its base connected by way of a resistance 83 to the outlet of the NAND 60 of the part 40 of elaboration and memory, the outlet of which is also connected to a positive terminal 84 by way of a resistance 85. The transistor 79 has its collector connected directly to the collector of the transistor 80 and its emitter connected directly to the base of this latter and to earth by way of a resistance 86. The transistor 80 has its emitter connected directly to earth and its collector connected to the positive terminal 82 by way of a diode 87 and a zener diode 88.

The part 41 is provided with three outlets 89, 90 and 91. The outlet 89 is connected directly to the collector of the power transistor 80 and from it are taken the signals which operate the actuator connected to the peripheral unit of FIG. 3. The outlets 90 and 91 are connected respectively to the outlet of the NAND 60 by way of a diode 93 and to the outlet of the NAND 69 by way of a diode 94, and from it are taken signals at logic level which give its condition to the peripheral unit, i.e., whether it is active or not. This condition can be communicated to the inlets 51, 52 and 53 of other peripheral units.

The part 41 is further provided with an inlet 92 connected to the collector of the transistor 80 by way of a lamp 95 and a diode 96. The supply for the lamp 95 arrives at the inlet 92.

The operation of the peripheral unit of FIG. 3 is as follows: Each time two signals "1" are simultaneously present at the inlets 42 and 43, transmitted by the central unit following the reading of information contained on the tape, the outlet of NAND 58 goes to "0" making the outlet of NAND 59 consequently rise to "1." A signal is transmitted from the outlet 54 to other peripheral units which ascertains the deactivation of functions which cannot coexist with that which it is wished to activate. If there are no signals "0" at the inlets 51, 52 and 53 and at the inlet 55 indicating the presence of interference with other peripheral units or with members on the machine and the presence of a signal of general zero setting and block of the machine respectively, and there are no RESET signals present at the inlets 48 and 49, the outlet of the NAND 60 goes to "0" thus causing the locking of the transistor 78 with consequent passage into the conducting state of the transistor 79 and consequent passage into conduction of the transistor 80.

The logic levels at the outlets are thus the following: "0" at the outlet 89 (a control signal 19 is transmitted to the actuator which follows so that it acts on the corresponding movable member in order to make it carry out the function corresponding to the information contained in the signals 6′ and 6″ applied to the inlets 42 and 43), "0" and "1" respectively at the outlets 90 and 91, "1" at the outlet 68 (absence of alarm signals 9″); a logic level "0" is also at the outlet 69 (absence of execution signal 9′) until a member disposed on the machine transmits a signal 11 indicating that the execution of the required function has taken place, this signal which, applied to the inlet 50 of the peripheral unit, brings to "1" the logic level of the outlet 69. The signal 9′ thus originated acts on the block 25 of the central unit 3 (FIG. 2) so as to make it emit a signal 37 which unblocks the reader control 26 should this have been previously blocked by a "wait executed" call?.

Because of the effect of the presence of a memory consisting of the NAND 59 and 60 the situation described remains unaltered even after cancellation of the signals 6′ and 6″ applied to the inlets 42 and 43, until the arrival of successive signals 6′ and 6″ at the inlets 44 and 45 of the peripheral unit. On arrival of these signals (at logic level "1") at the inlets 44 and 45, the outlet of NAND 61 goes to "0" causing the outlet of NAND 60 to rise to "1;" consequently the transistor 78 passes into the conducting state, the transistor 79 locks and the transistor 80 locks, so cancelling the signal 19 at the outlet 89 of the peripheral unit and thus deactivating the actuator connected to it. Similarly the logic level of the signals at the outlets 90 and 91 is inverted.

Instead of being controlled by the signals 6′ and 6″ distributed by the decoder 20 of the central unit 3 to the inlets 42 and 43 for activation and 44 and 45 for deactivation, the peripheral unit can be controlled by signals 18 emitted by manual controls 16 if the reader control 26 has been blocked by a "stop tape" signal / or by a signal coming from the manual controls 16. On applying these signals 18 (at logic level "0") to the inlet 46 the peripheral unit is activated, while by applying them to the inlets 48 and 49 the peripheral unit is deactivated.

The changes of state of the various logic members included in the peripheral unit are still those previously described and it is thus not necessary to repeat them.

It is however necessary to observe that, as in the case of the activation signals applied to the inlets 42 and 43, the activation signals applied to the inlet 43 also operate only in the absence of "0" signals at the inlets 51, 52, 53 and 55. In fact, if a signal (13 or 11) at logic level "0" is present even at only one of the inlets 51, 52 and 53, the outlet of NAND 65 is "1," the outlet of the inverter 64 is "0," the outlet of the AND 62 is "0" and the outlet of NAND 60 is maintained at "1" notwithstanding the arrival of activation signals at the inlets 42, 43 or 46. The outlet 89 thus remains at "1." Simultaneously the level "1" of the outlet of NAND 65 combines with the level "1" of the outlet of NAND 59 and causes the appearance at the outlet 68 of an alarm signal 9″, at logic level "0," which, transmitted to the block 33 of the central unit, causes emission of a signal 32 which blocks the reader control until cancellation of the danger condition and the successive operation of one of the "preselection" controls and the "start working" control included in the block 15 of FIGS. 1 and 2.

Similarly the presence of a signal at logic level "0" at the inlet 55 blocks the outlet of NAND 60 at the level "1" and thus maintains the peripheral unit inactive.

A particular function is carried out by that part of the peripheral unit which comprises the inlets 56 and 57, NAND 70, the condenser 72, the resistances 73 and 75 and the outlets 76 and 77. The function of this part of the peripheral unit is to permit the direct activation or deactivation of the peripheral unit at a condition imposed by an external member or by another peripheral unit. In this case one of the two inlets 56 or 57 has applied to it an inverted activation or deactivation signal (according to that which it is desired to carry out on the peripheral unit) and the other inlet has applied to it a signal relative to the imposed condition. By connecting the outlet 76 to one of the inlets 46 or 48, 49, the desired function is made. A signal is present at the outlet 77 derived from that present at the outlet 76 and usable for any particular applications when the availability of a signal of limited duration is necessary.

Another use for this latter part of the peripheral unit will be described hereinafter with reference to FIGS. 4, 5 and 6, Before ending the description of the structure and operation of the peripheral units, it is necessary to observe that while in the case of FIG. 3 it has been supposed that the memory part 40 is followed by a single power switch 41, in other cases the part 40 could control two power switches working in phase opposition, i.e., so that the outlet of the one is at logic level "1," while the outlet of the other is at logic level "0" and vice versa. The presence of the second power switch makes an active output signal available even when the memory included in the part 40 is deactivated.

As stated, the peripheral units provided in the programmer may be varied, namely one for each actuator. In certain cases a movable member of the machine may be required to carry out functions of a single sign, i.e., movements in one direction only, while in other cases the same movable member is required to carry out equal functions but of different sign, i.e., movements in one direction and in the opposite direction. In the first case each movable member is provided with a single actuator and thus with a single peripheral unit which receives the information transmitted from the central unit and transmits it in its turn to the actuator which controls said movements in a single direction of the corresponding movable member. In the second case however each movable member is provided with two actuators, one for the movement in one direction and the other for the movement in the opposite direction, each of which is controlled by its own peripheral unit such as that described with reference to FIG. 3.

These peripheral units, normally collected together for constructional reasons in a single box, may be connected to a unit called "positioning unit" instead of being connected directly to the central unit, in the case in which it is required to position a movable member in a number of intermediate positions between two extreme positions, these intermediate positions being defined by suitable limit switches. The positioning unit receives the information transmitted by the central unit and transmits it in its turn to that of the peripheral units which is concerned with the movement controlled by the information received, i.e., to the peripheral unit for forward movement if the position called is forward of that of the controlled member and to the peripheral unit for backward movement if the position called is to the back of that of the controlled member. It does not transmit it if the member concerned is already in the required position.

Figure 4:
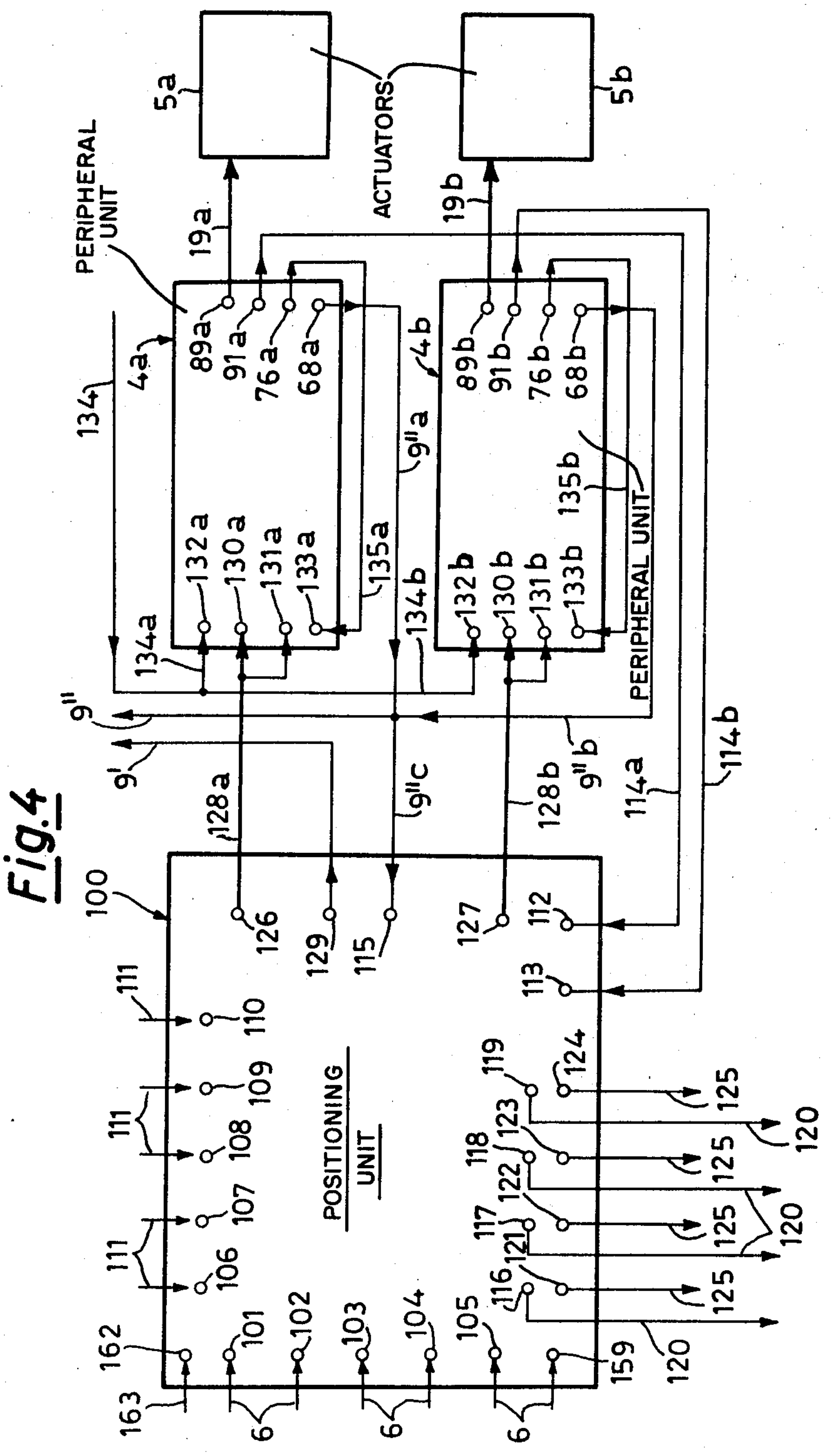
FIG. 4 is a diagrammatical representation in block form of a positioning unit of said programmer.

The block diagram of a positioning unit with its corresponding peripheral units and the corresponding actuators is shown in FIG. 4 where the actuators are indicated by the reference numerals 5a (actuator "forward") and 5b (actuator "backward"), the corresponding peripheral units by 4a and 4b, the signals transmitted by the peripheral units to the corresponding actuators by 19a and 19b and the positioning unit by 100. The positioning unit is provided with five inlets 101, 102, 103, 104 and 105 to which the signals 6 of "SET tape" arrive transmitted by the central unit, or any manual control signals from the block 16 of FIG. 2, an inlet 159 to which the signals 6 of "RESET tape" arrive transmitted by the central unit, five inlets 106, 107, 108, 109 and 110 to which signals 111 transmitted by limit switches disposed on the machine arrive, two inlets 112 and 113 to which signals 114a and 114b from the outlets 91a and 91b of the two peripheral units arrive for indicating which of the two peripheral units is active, an inlet 115 for an alarm signal 9''c consisting of one or the other of the alarm signals 9''a and 9''b which may be present at the outlets 68a and 68b of the two peripheral units and together constituting a signal 9'' for the central unit, and finally an inlet 162 to which any signals 163 of "general RESET" arrive (those which arrive at the inlet 55 of the peripheral unit of FIG. 3).

The positioning unit 100 is further provided with four outlets 116, 117, 118 and 119 from which signals 120 are taken which deactivate or block the other peripheral units which may be controlling functions in contradiction to that sometimes controlled by the positioning unit. From other four outlets 121, 122, 123 and 124, signals 125 are taken which constitute the inverse logics of the signals 120. From other outlets 126 and 127 signals 128a and 128b are taken which activate the two peripheral units, while on termination of a function an execution signal 9' is taken from the outlet 129.

The signals 128-a and 128b arrive at the inlets 130a and 130b respectively of the peripheral units 4a and 4b, each of which corresponds to the inlet 46 of a peripheral unit such as that of FIG. 3. Said signals 128a and 128b also arrive at the inlets 131a and 131b, which correspond for each peripheral unit 4a and 4b to one of the inlets 56, 57 of FIG. 3. In FIG. 4 the peripheral units 4a and 4b are shown provided with respective inlets 132a and 132b, each representing the group of inlets 51, 52, 53 of FIG. 3, and of respective inlets 133a and 133b, each representing the group of inlets 48, 49 of FIG. 3. At the inlets 132a and 132b signals arrive derived from signals 134 (134a and 134b respectively for the two peripheral units 4a and 4b) representing the group of signals 13 and 11 coming respectively from other peripheral units and from members on the machine, while at the inlets 133a and 133b the signals 135a and 135b arrive which are from the two outlets 76a and 76b respectively, i.e., the outlets 76 of each peripheral unit are connected to at least one of the inlets 48, 49 of the peripheral unit itself.

Figure 5:
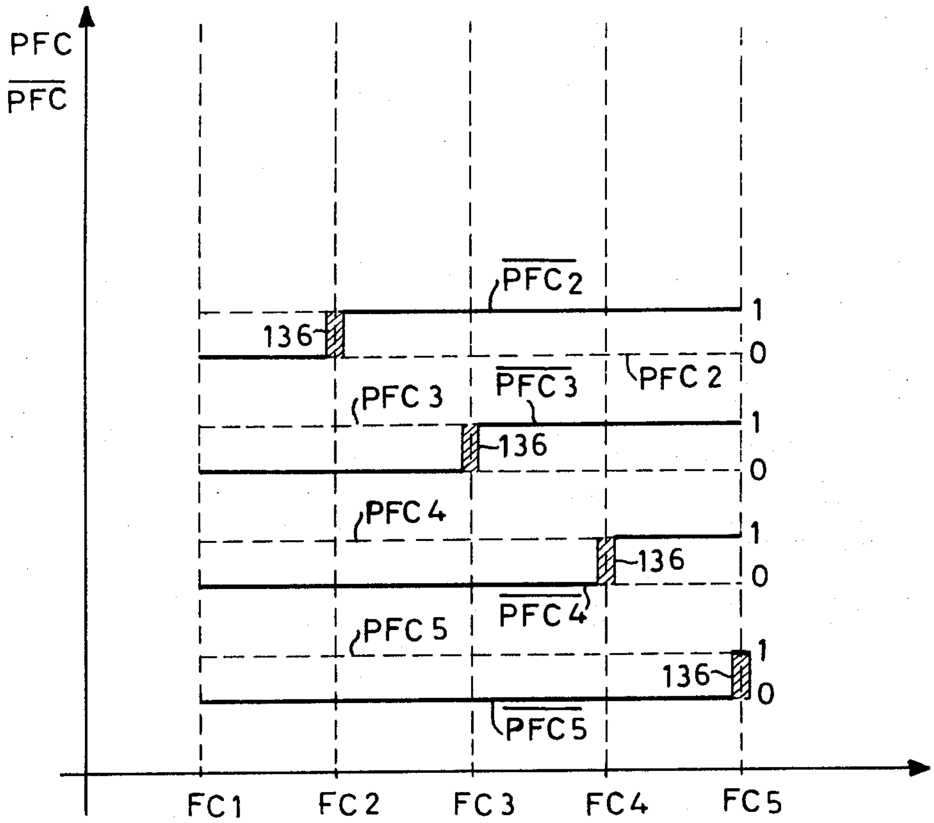
FIG. 5 is a graph which shows the action of limiting members situated on the machine and electrically connected to said positioning unit.

The operation of the complex shown in FIG. 4, and in particular of the positioning unit 100, is seen by observing FIGS. 3 and 5 in addition to FIG. 4. FIG. 5 shows a graph which shows the variations in logic levels of the signals 120 and 125 as a function of the position of the movable member which it is wished to control with respect to the limit switches which free the signals 111. In said graph the abscissa represents the reciprocal positions of the limit switches (indicated by the symbols FC1, FC2, FC3, FC4 and FC5 relative to the limit switches connected respectively to the inlets 106, 107, 108, 109 and 110) while the ordinate represents the logic livels of the various signals 120 and 125 present at the outlets 116, 117 118, and 119 and at the outlets 121, 122, 123 and 124. These signals are indicated by the symbols PFC2, PFC4 and PFC5 if relative to the outlets 116–119 and with the symbols $\overline{PFC2}$, $\overline{PFC3}$, $\overline{PFC4}$ and $\overline{PFC5}$ if relative to the outlets 121–124.

The signals $\overline{PFC}$ ($\overline{PFC2}$, $\overline{PFC3}$, $\overline{PFC4}$ and $\overline{PFC5}$) are represented by broken lines while the signals PFC (PFC2, PFC3, PFC4, PFC5) are represented by continuous lines, the broken zones 136 indicating the commutation zones of the limit switch. For each pair of signals PFC – PFC the lower level represents the logic level "0, " while the upper level represents the logic level "1. " The path of travel of the member to be controlled is represented by the distance between FC1 and FC5.

As can be seen from said FIG. 5, the arrival of the movable member at one of the limit switches causes one of the various pairs of signals PFC – $\overline{PFC}$ to be switched, because of which for each position of the movable member with respect to the limit switches FC (FC1, FC2, FC3, FC4, FC5) there corresponds a different combination of the signals PFC and $\overline{PFC}$. These signals, in addition to being present at the outlets 116–119 and 121–124, combine inside the positioning unit, as will be better seen hereinafter with reference to FIG. 6, with the signals 6 which arrive from time to time at the inlets 101–105 in such a manner as to give rise to the signals 128*a*, 128*b*, alternately one with the other, which respectively control the peripheral units 4*a* and 4*b* and the corresponding actuators 5*a* (forward travel) and 5*b* (backward travel). Supposing for example that the movable member to be controlled is in an intermediate position between the limit switches FC2 and FC3 and that a signal arrives at one of the inlets 101–105 from the central unit to control the movement of the movable member as far as the limit switch FC4 (more precisely this signal will arrive at the inlet 104, and any signals which control movements towards the limit switches FC1, FC2, FC3 and FC5 will arrive at the inlets 101, 102, 103 and 105, this fact will also appear evident hereinafter, during the description of the particular embodiment of a positioning unit as shown in FIG. 6). This signal will encounter the following situation: the signals $\overline{PFC2}$, PFC3, PFC4 and $\overline{PFC5}$ are at the logic level "1, " and the signals PFC2, $\overline{PFC3}$, $\overline{PFC4}$ and $\overline{PFC5}$ are at the logic level "0. " The combination of these latter signals indicates to the signal 6 at the inlet that the movable member is between FC2 and FC3, because of which the signal 6 causes the emission of a signal 128*a* which controls the peripheral unit 4*a* and consequently the actuator 5*a* so that the movable member moves forward and is made to reach the position defined by the limit switch FC4. If however a signal 6 had arrived controlling the movement of the movable member towards FC1 (or FC2), its combination with the signals PFC and PFC would have caused the emission of a signal 128*b* for controlling the peripheral unit 4*b* and the actuator 5*b* for making the movable member to be controlled move backward.

The combination of the signals 6 at the inlets 101–105 with the signal PFC and $\overline{PFC}$ (these latter determined by the position of the movable member with respect to the limit switches FC) hence causes the emission alternatively of signals 128*a* and 128*b* which, applied to the inlets 130*a* and 130*b* of the two peripheral units, control the activation of these latter and the consequent operation alternatively of the actuators 5*a* and 5*b*. The state of the two peripheral units is communicated to the positioning unit by the signals 114*a* and 114*b* to indicate whether the peripheral units are in the active or non-active condition.

While the signals 128*a* and 128*b* remain unaltered, that peripheral unit selected of the two will remain active and continue to control the operation of the corresponding actuator. When, however, following the arrival of the controlled movable member at the selected limit switch (with the consequent emission of an executive signal 9'), the signals 128*a* or 128*b* changes its logic level, a signal is applied to the inlet 131*a* or 131*b* of the peripheral unit which was active until that moment, and causes the emission at the outlet 76*a* or 76*b* of an inverted signal 135*a* or 135*b* which deactivates the peripheral unit which was active until that moment, causing the movable member to stop at the limit switch arrived at. The application described is one of the possible applications of the inlets 56 and 57 and the outlet 76 of a peripheral unit such as that shown in FIG. 3. Its outlet 77 could be utilized in the same manner as the outlet 76. The only difference consists of the limited duration of the signals from the outlet 77 in comparison with the unlimited duration of the signals leaving the outlet 76.

Figure 6:
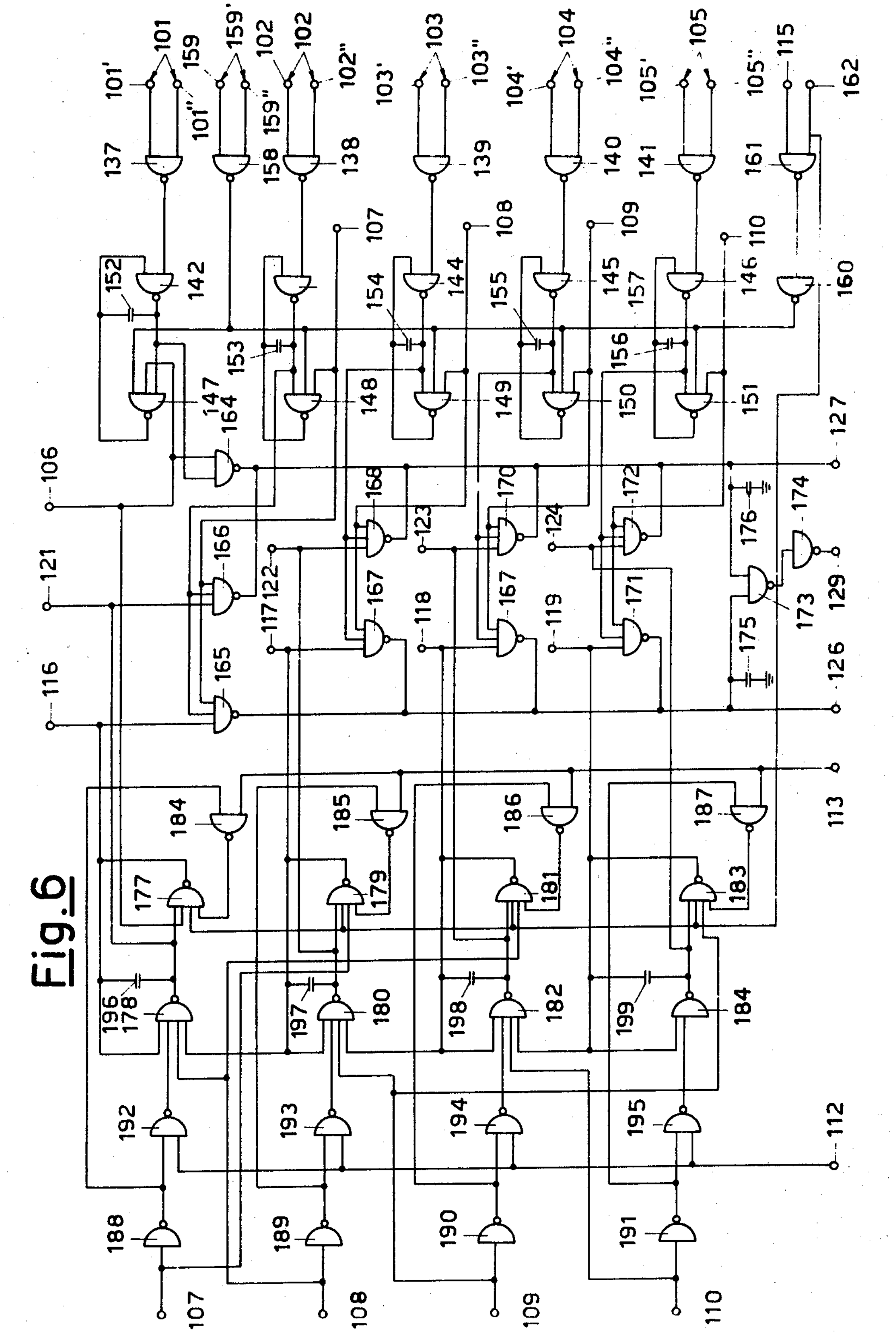
FIG. 6 shows the detailed circuit diagram of said positioning unit.

A particular embodiment of the positioning unit described with reference to FIGS. 4 and 5 (where it should be observed that the limit switches, and hence the inlets 101–105 and the inlets 106–110 have been limited to five for simplicity of description, but could also be of greater or lesser number) is shown in FIG. 6 where two inlets corresponding to the inlet 101 of FIG. 4 are indicated by the reference numerals 101' and 101'', two inlets corresponding to the inlet 102 of FIG. 4 by 102' and 102'', two inlets corresponding to the inlet 103 of FIG. 4 by 103' and 103'', two inlets corresponding to the inlet 104 of FIG. 4 by 104' and 104'', two inlets corresponding to the inlet 105 of FIG. 4 by 105' and 105'', the two inlets of FIG. 6 for each inlet of FIG. 4 being due to the fact that as FIG. 6 is a detailed circuit diagram, it must provide the inlets both for the signals 6' and the signals 6'' which comprise each signal 6, this distinction not being necessary in FIG. 4 which shows a simple block diagram.

Each pair of inlets 101' – 101'', 102' – 102'', 103' – 103'', 104' – 104'', 105' – 105'' is connected to the inlet of a logic member NAND (137, 138, 139, 140 and 141 respectively) and the outlets of these NAND are connected to the inlet of corresponding NAND 142, 143, 144, 145 and 146, their other inlet being connected to the outlet of corresponding NAND 147, 148, 149, 150 and 151, one of their inlets being connected to the outlet of the NAND 142, 143, 144, 145 and 146, between the outlet of the NAND 147–151 and the outlet of the NAND 142–146, there being connected condensers 152, 153, 154, 155 and 156 the function of which is to filter any disturbances. Another inlet of each of the NAND 147–151 is connected to a common wire 157 connected to the outlet of an NAND 158 to the inlet of which are connected two inlets 159' and 159'' corresponding to the "tape RESET" inlet 159 shown in FIG. 4 (in this case there are also two inlets because the signals 6 are double, 6'–6'', which arrive at these inlets) and also connected to the outlet of an inverter 160 whose inlet is connected to the outlet of a NAND 161, the inlets of which being connected to the inlets 115 and 162, the first relative to a possible alarm signal 9*c''*, the second relative to a possible "general RESET" signal 163.

The inlets 106–110 of the signals 111 transmitted by the limit switches are connected to the inlets of the NAND 147–151, one for each of said NAND. The inlet 106 is also connected to an inlet of a NAND 164, the outlet of the NAND 142 being connected to another of its inlets. The outlet of the NAND 164 is connected to the outlet 127 which controls the peripheral unit 4b relative to the backward travel of the movable member to be controlled (FIG. 4).

The inlet 107 is in its turn connected to an inlet of the two NAND 165 and 166, whose outlets are connected respectively to the outlets 126 (control of the peripheral unit 4a relative to the forward travel of the movable member to be controlled) and 127. Another inlet of each of the two NAND 165 and 166 is connected to the outlet of the NAND 143, a third inlet of the NAND 165 is connected to the outlet of a NAND 177 and to the outlet 116 (FIG. 4) a third inlet of the NAND 166 is connected to the outlet of a NAND 178 and to the outlet 121 (FIG. 4).

The inlet 108 is connected to an inlet of two NAND 167 and 168, their outlets being connected respectively to the outlets 126 and 127. Another inlet of each of the two NAND 167 and 168 is connected to the outlet of the NAND 144, a third inlet of the NAND 167 is connected to the outlet of a NAND 179 and to the outlet 117. A third inlet of the NAND 168 is connected to the outlet of a NAND 180 and to the outlet 122.

The inlet 109 is connected to an inlet of two NAND 169 and 170, whose outlets are respectively connected to the outlets 126 and 127. Another inlet of each of the two NAND 169 and 170 is connected to the outlet of the NAND 145, a third inlet of the NAND 169 is connected to the outlet of a NAND 181 and to the outlet 118, a third inlet of the NAND 170 is connected to the outlet of a NAND 182 and to the outlet 123.

The inlet 110 is connected to an inlet of two NAND 171 and 172, whose outlets are connected respectively, to the outlets 126 and 127. Another inlet of each of the two NAND 171 and 172 is connected to the outlet of the NAND 146, a third inlet of the NAND 171 is connected to the outlet of a NAND 183 and to the outlet 119, a third inlet of the NAND 172 is connected to the outlet of the NAND 184 and to the outlet 124.

The common outlets of the NAND 165, 167, 169 and 171 and the common outlets of the NAND 164, 166, 168, 170 and 172 (and hence the outlets 126 and 127) are connected to two distinct inlets of a NAND 173 whose outlet is connected to the inlet of an inverter 174, the outlet of which is connected to the outlet 129 (FIG. 4). Two condensers 175 and 176 connected between the outlets 126 and 127 and earth function as filters for any disturbances.

The NAND 177 and 178, 179 and 180, 181 and 182, 183 and 184 are connected together so as to constitute memories which indicate the position of the movable member to be controlled with respect to the limit switches connected to the inlets 106–110. For this purpose the outlet of the NAND 178 is connected to an inlet of the NAND 177 and the outlet of this latter is connected to an inlet of the former. To another inlet of the NAND 177 is connected the outlet of a NAND 184, the inlets of which are connected to the inlet 113 (indicating the state of the peripheral unit 4b) and the outlet of an inverter 188 to whose inlet is connected the inlet 107 (it should be noted that FIG. 6 shows two inlets 107, two inlets 108, two inlets 109 and two inlets 110. However this doubling is done exclusively in order not to complicate the drawing, each of these pairs corresponding in effect to a single inlet). A further inlet of the NAND 177 is connected to the inlet 106, while a fourth inlet of the said NAND 177 is connected to the inlet 162 of "general RESET."

While, as stated, a first inlet of the NAND 178 is connected to the outlet of the NAND 177, a second inlet of the NAND 178 is connected to the inlet 108, a third inlet is connected to the outlet of the NAND 179 and a fourth inlet is connected to the outlet of a NAND 192 which has one inlet connected to the inlet 112 and one inlet connected to the outlet of the inverter 188. A condenser 196 connected between the outlets of the NAND 177 and 178 acts as a filter for any disturbances.

Analogously the NAND 179, in addition to a first inlet connected to the outlet of the NAND 180, has a second inlet connected to the inlet 162, a third inlet connected to the inlet 107 and a fourth inlet connected to the outlet of a NAND 185, one inlet of which is connected to the inlet 113 while the other inlet is connected to the outlet of an inverter 189 whose inlet is connected to the inlet 108. The NAND 180, in addition to a first inlet connected to the outlet of the NAND 179, as a second inlet connected to the inlet 109, a third inlet connected to the outlet of the NAND 181 and to the inlet 118 and a fourth inlet connected to the outlet of a NAND 193 which has one inlet connected to the inlet 112 and another inlet connected to the outlet of the inverter 189. A condenser 179 connected between the outlets of the NAND 179 and 180 acts as a filter for any disturbances.

Analogously the NAND 181, in addition to a first inlet connected to the outlet of the NAND 182, has a second inlet connected to the inlet 162, a third inlet connected to the inlet 108 and a fourth inlet connected to the outlet of a NAND 186 which has one inlet connected to the inlet 113 and one inlet connected to the outlet of an inverter 190 whose inlet is connected to the inlet 109. The NAND 182, in addition to a first inlet connected to the outlet of the NAND 181, has a second inlet connected to the inlet 110, a third inlet connected to the outlet of the NAND 183 and a fourth inlet connected to the outlet of a NAND 194 which has one inlet connected to the inlet 112 and one inlet connected to the outlet of the inverter 190. A condenser 198 connected between the outlets of the NAND 181 and 182 acts as a filter for any disturbances.

Finally the NAND 183, in addition to a first inlet connected to the outlet of the NAND 184, has a second inlet connected to the inlet 162, a third inlet connected to the inlet 109 and a fourth inlet connected to the outlet of a NAND 187 which has one inlet connected to the inlet 113 and one inlet connected to the outlet of an inverter 191 whose inlet is connected to the inlet 110. The NAND 184, in addition to a first inlet connected to the outlet of the NAND 183, has a second inlet connected to the outlet of a NAND 195 which has one inlet connected to the inlet 112 and one inlet connected to the outlet of the inverter 191. A condenser 199 connected between the outlets of the NAND 183 and 184 acts as a filter for any disturbances.

As already stated in the foregoing, the present description is limited to a positioning unit provided with only five limit switches. However the manner in which it is possible to extend it to further limit switches is easily understood. It is in fact sufficient to connect a third and a fourth inlet of the NAND 184 to a sixth limit switch inlet and to the outlet of a memory of the type such as those composed of one of the NAND 178, 180, 182 and 184 and that corresponding to the NAND 177, 179, 181, 183, branch from this latter added memory outlets similar to those indicated by 116–119 and 121–124, connect these latter to the inlets of other NAND such as those indicated by 165–172 and connect the outlets of these latter to the outlets 126 and 127. Analogously other inlets must be provided such as those indicated by 101–105 with the corresponding NAND such as those indicated by 147–151 and 142–146, other NAND connected such as NAND 192–195, and 184–187, and so on.

Further, if desired, inlets could be provided for manual control signals from the block 16 of FIG. 2. These inlets could be disposed for example between the outlets of the NAND 137–141 and the inlets of the NAND 142–146.

However the diagram shown in FIG. 6 is already sufficiently indicative of the constitution of the positioning unit 100 and consequently in the successive description of its operation reference will be made only to that which is shown in the said FIG. 6. In order to describe the operation of the positioning unit shown in FIG. 6 it is necessary first of all to state that the limit switches FC1–FC5 are connected to the inlets 107–110 in such a manner that signals are present at the inlets 107–110 of logic level "0" if the member to be controlled is in a position corresponding to them, and signals at logic level "1" in the opposite case. From that which has been stated regarding the peripheral unit shown in FIG. 3 it is also known that the signals at the inlets 101–105 are at logic level "1" if present and at logic level "0" if absent (and thus also at the inlet 159), the signals at the inlets 112 and 113 are "0" if the corresponding peripheral unit (4*a* and 4*b* respectively) is nonactive and "1" if it is active, the signals at the inlet 115 are "1" if absent and "0" if present and thus also the signals at the inlet 162. It will be supposed that the movable member to be controlled is at rest in an intermediate position between FC1 and FC2. In this situation the inlets 107–110 all have signals "1" because of which the memories constituted by the NAND 177 and 178, 179 and 180, 181 and 182, 183 and 184 are in a state such as to maintain at logic level "1" all the outlets 116–119 and at logic level "0" all the outlets 121–124, such as is shown in FIG. 5. On the other hand, until signals "1" arrive at the inlets 102–105, the memories constituted by the NAND 142 and 147, 143 and 148, 144 and 149, 145 and 150, 146 and 151 are all in a state such as to maintain at "0" the outlets of the NAND 142–146 and hence at "1" the outlets of the NAND 164–172. The signals present at the outlets 126 and 127 are consequently at logic level "1" and do not activate the peripheral units in that, as already stated regarding the peripheral unit of FIG. 3, at the inlets 46 (130*a* and 130*b* in FIG. 4) signals "0" are necessary in order to activate the peripheral units. As the peripheral units 4*a* and 4*b* are nonactive the signals at the inlets 112 and 113 are consequently "0."

It will now be supposed that at the inlet 103 a pair of signals 6′–6″ arrives carrying the order to move the movable member as far as the limit switch FC3. If no "0" signals are present at the inlets 115 and 162, the memory consisting of the NAND 144 and 149 changes state because of which three "1" signals well be simultaneously present at the inlet of the NAND 167 such that its outlet goes to "0" with consequent liberation of a signal "0" by the outlet 126. The outlet 127 remains at "1." The change of logic level of the outlet 126 makes a "0" signal become applied to the inlet 130*a* of the peripheral unit 4*a*. This becomes active and sends to the actuator 5*a* a signal 19*a* which controls the forward movement of the movable member.

Because of the activation of the peripheral unit 4*a* a signal 114*a* at logic level "1" is transmitted to the outlet 91*a* of the same peripheral unit at the inlet 112 of the positioning unit and hence applied to the inlets of the NAND 192–195, where however it does not cause change of state.

The situation remains unaltered until the movable member arrives at and goes beyond the limit switch FC2. At the moment of its arrival FC2 switches over and makes the logic level of the signal at the inlet 108 descend to "0." Two signals "1" are then applied to the inlet of the NAND 192 because of which its outlet goes to "0" causing change of state of the memory constituted by the NAND 177 and 178 and the consequent switching to "0" and "1" respectively of the logic levels of the outlets 116 and 121. This situation remains even after the movable member has gone beyond the limit switch FC2 making it thus return to "1" the logic level of the signal applied to the inlet 107. In fact the outlet of the NAND 192 returns to "1," but because of the effect of the feedback between the NAND 178 and 177, a signal "0" is present at the inlet of the NAND 178 which maintains the memory in the state previously defined and hence maintains the outlets 116 and 121 at "0" and "1" respectively, such as is shown by the graph of FIG. 5. The level of the outlet 126 also remains unaltered, the peripheral unit 4a remains active and the movable member continues to travel towards FC3.

The situation changes when the movable member reaches the limit switch FC3. The logic level of the inlet 108 then becomes "0" because of which at the inlet of the NAND 167 the signals applied are not all "1" and the preceding signal "0" disappears from the outlet 126 which is returned to "1" with the consequent liberation of an executed signal at the outlet 129, this executed signal warning the central unit that the required position has been reached. A signal "1" is then applied to the inlet 131*a* of the peripheral unit 4*a* because of which, by the effect of the connection between the outlet 76*a* and the inlet 133*a*, the said peripheral unit becomes nonactive and control signals are no longer transmitted for the actuator 5*a*. The movable member consequently stops. On the other hand at the inlet of the NAND 193 two "1" signals are applied and hence its outlet goes to "0," the memory consisting of the NAND 179 and 180 changes state so bringing the logic level of the outlet 117 to "0" and the logic level of the outlet to "1."

Supposing now that a pair of signals 6′–6″ arrives at the inlet 102 to control the return of the movable member into the position defined by FC2. The memory consisting of the NAND 143 and 148 changes state bringing about the simultaneous presence of three levels "1" at the inlet of the NAND 166. At the outlet 127 there is then a signal "0" which, applied to the inlet 130 of the peripheral unit **4*b*, causes the activation of this latter and the consequent liberation of a control signal for the actuator 5*b***, which in its turn acts on the movable member in such a manner as to move it towards FC2.

When the controlled member arrives at FC2, the level of the inlet 107 goes to "0" because of which the outlet of the NAND 166 returns to "1" with consequent switching to "1" of the outlet 127. The peripheral unit **4*b* is consequently deactivated and the controlled member stops. At the same time an executed signal present at the outlet 129** informs the central unit that the imparted order has been carried out.

In addition the combination of two logic levels "1" at the inlet of the NAND 184 (the logic level of the inlet 113 was changed on activation of the peripheral unit **4*b*) makes the outlet of the NAND 184 pass to "0" and the consequent switching of the memory consisting of the NAND 177 and 178. The logic level of the outlets 116 and 127** consequently is inverted.

It was stated at the beginning of the description of operation of the positioning unit of FIG. 6, that the arrival of control signals at the inlets 101–105 causes the forward or backward movement of the controlled member provided that there are no signals at logic level "0" present at the inlets 115 and 162, indicating an "alarm" situation or a "general RESET" control respectively. In the first case all the memories constituted by the NAND 142–146 and 147–151 become deactivated (and are maintained deactivated) and hence the signals sent by them to the inlets of the NAND 165–172 are switched to "0" with the outlets 126–127 being consequently at "1." On the other hand the "general RESET" signal, which is of limited duration, imposes a condition of rest and wait for the successive calls to the memories consisting of the NAND 142–146 and 147–151, and at the memories consisting of the NAND 178–184 and 177–183.

The setting to zero of the positioning unit can however also be obtained by sending signals "1" to the inlets 159′ and 159″, which causes the deactivation of the memories consisting of the NAND 142–146 and 147–151 and the consequent setting at "1" of the outlets 126 and 127.

The group consisting of a positioning unit plus a peripheral unit such as that shown in FIG. 4 can be replaced by a single positioning unit such as the unit 4A of FIG. 2, which receives from the decoder 20 information consisting of a letter (sent along the path 21″″) and three binary members (sent along the path 2″″″), this information referring to positioning levels of the controlled member by the said peripheral unit. The information received is memorized in the peripheral unit 4A, whose outlet, which is a function both of the information coming from the tape and of the information 11A and 13A coming from members situated on the machine and from the other peripheral units respectively, is compared with an analogous signal which indicates the actual level of the controlled member. The difference between the controlled level signal and the actual level signals controls the member to move until it reaches the position corresponding to the cancellation of this difference, i.e., the controlled position. The feedback system which permits this comparison is not shown in FIG. 2 because it is of absolutely conventional type, known to the technicians of the branch. It should however be noted that executed and alarm signals 9′A and 9″A respectively are taken from the outlet of the peripheral unit 4A.

Returning to the diagram of FIG. 2, a very important role in the operation of the programmer according to the invention is occupied by the block 26, previously indicated as "reader control." This block in fact is that which receives the various pieces of information coming from the tape, from the peripheral units and from the positioning unit (execution and alarm signals), and from the manual controls of the block 15, and in its turn controls the forward movement or arrest of the tape according to the information received. In order to better understand its method of operation, a preferred embodiment will now be described with reference to FIG. 7. The "reader control" shown in this FIG. comprises a group of memories whose state is indicative of the situation of the system and of the imparted controls, this state as will be seen conditioning the operation of the whole of the "reader control." A first memory 200 comprises two NAND 201 and 202 connected together in cascade, with a return wire. To the inlet of the NAND 201 are connected an inlet terminal 203 for the "general RESET" signals and an inlet terminal 204 for the signals 14″″ which control the passage into manual, in addition to the outlet of the NAND 202. To the inlet of the NAND 202 are connected an inlet terminal 206 for the signals 14′ controlling the preselection of the various operational blocks and an inlet terminal 207 for the signals 14″ (of "start working") controlling the "automatic" operation of the programmer, in addition to the outlet of the NAND 201. The outlet of NAND 202 is connected to a terminal 208, while the outlet of NAND 201 is connected to a terminal 209. A condenser 210 to filter any disturbances is connected between the outlets of the two NAND 201 and 202.

Another memory 211 comprises two NAND 212 and 213 connected together in cascade with a return wire. To the inlet of the NAND 212 is connected an inlet terminal 214 for the signals 14″, in addition to the outlet of the NAND 213, while to the inlet of the NAND 213 are connected an inlet terminal 215 for the signals relative to the "stop tape" information read on the tape, an inlet terminal 216 for signals 14‴ coming from the block 15 of FIG. 2 and controlling the arrest of the tape, a terminal 217 connected to the terminal 208 of the memory 200 and, by way of a diode 218, an inlet terminal 219 for the preselection signals 14′, in addition to the outlet of the NAND 212. The memory 211 has two outlet terminals 220 and 221, the first connected to the outlet of the NAND 213 and the second connected to the outlet of the NAND 212. Between the outlets of the two NAND 212 and 213 is connected a condenser 222 which filters any disturbances.

A third memory 223 comprises two NAND 224 and 225 connected together in cascade with a return wire. The outlet of the NAND 225 is connected to the inlet of the NAND 224 together with a terminal 226 connected in its turn (not shown in the drawing) to the outlet terminal 208 of the memory 200. To the inlet of the NAND 225 is connected an inlet terminal 227 for the preselection signals 14' (i.e., a terminal which receives the same signals received by the terminals 206 and 219 of the memories 200 and 211) in addition to the outlet of the NAND 224. The outlet of the memory 223 consists of a terminal 228. A condenser 229 is connected between the outlets of the two NAND 224 and 225 in order to filter any disturbances.

A fourth memory 230 comprises two NAND 231 and 232 connected together in cascade with a return wire. To the inlet of the NAND 231 are connected an inlet terminal 233 for the preselection signals 14' and a terminal 234 connected in its turn to the outlet terminal 208 of the memory 200, in addition to the outlet of the NAND 232. The outlet of the NAND 231 is connected to the inlet of the NAND 232 together with an inlet terminal 235 for the signals transmitted by the decoder 20 of FIG. 2 along the path 2''''' in order to inform the reader control that the letter indicating the address of the selected block has been read. The outlet of the memory 230 consists of a terminal 236 which is connected to the decoder 20 of FIG. 2 so as to transmit to it as necessary the signals 39 which block all the information read with the exclusion of that relative to the addresses of the block as they are preselected. A condenser 237 connected between the outlets of the two NAND 231 and 232 filters any disturbances.

Figure 7:
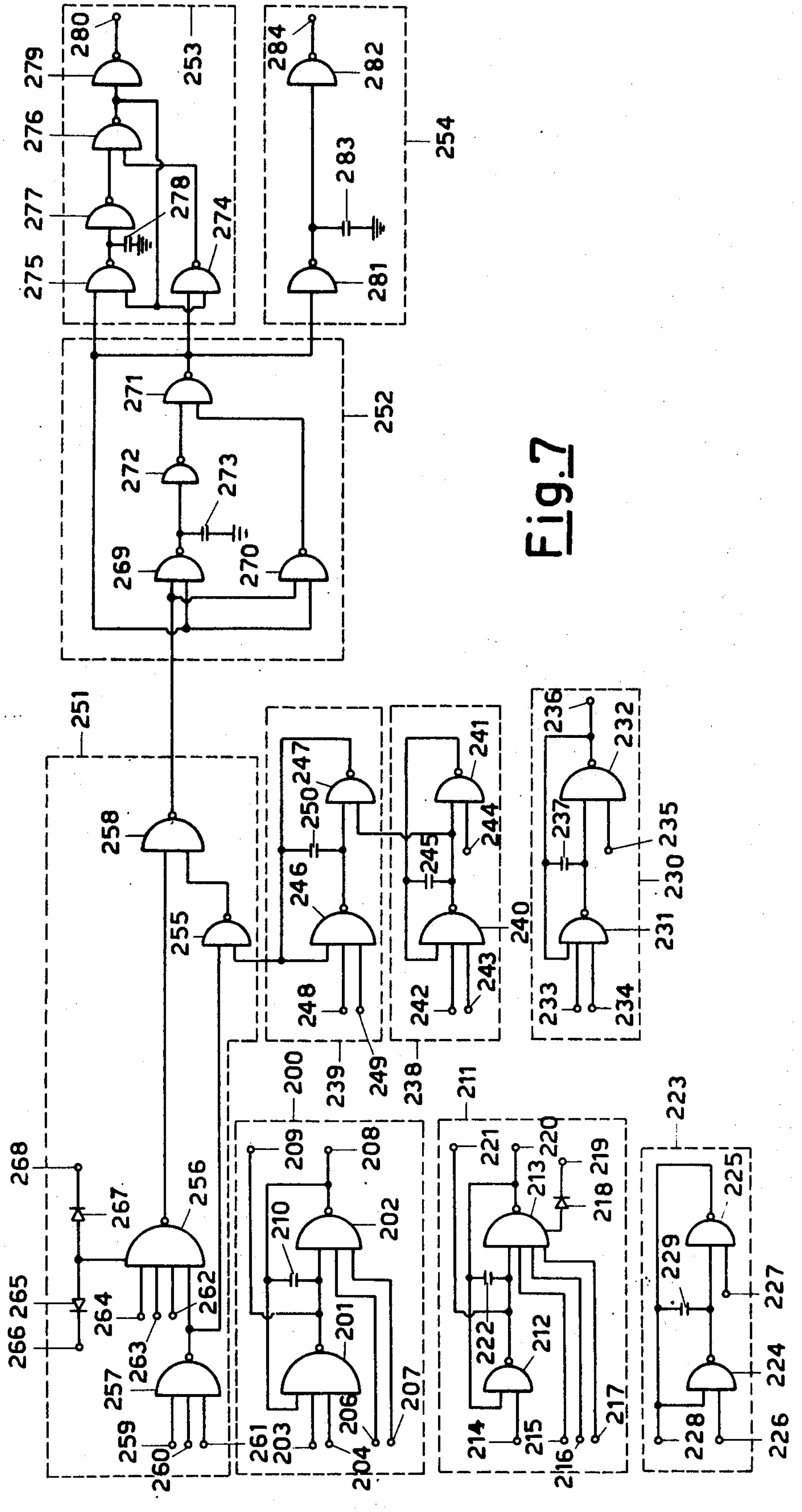
FIG. 7 shows the detailed circuit diagram of a preferred embodiment of the "reader control" in the central unit of the programmer according to the invention.
Figure 8:
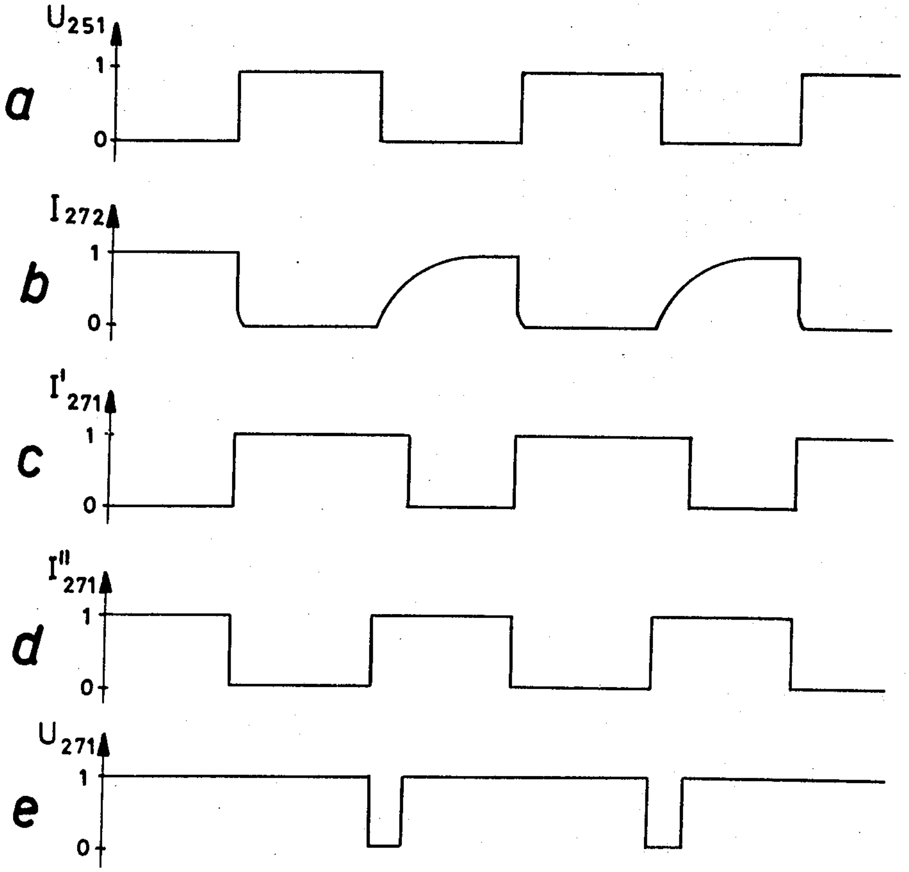
FIGS. 8, 9 and 10 are particularly useful graphs for understanding the operation of the "reader control" of FIG. 7.

The reader control of FIG. 7 comprises a further two memories 238 and 239 connected together in such a manner that the condition of the one (238) influences the condition of the other (239). The memory 238 comprises two NAND 240 and 241 connected together in cascade with a return wire. The inlet of the NAND 240 is connected to the outlet of the NAND 241 and to an inlet terminal 242 for the "general reset" signals and to a terminal 243 to which the signals transmitted by the decoder 20 along the path 22''''' arrive.

The inlet of the NAND 241 is connected to the outlet of the NAND 240 and to an inlet terminal 244 for the preselection signals 14'. A condenser 245 connected between the outlets of the two NAND 240 and 241 filters any disturbances. The memory 239 comprises two NAND 246 and 247 connected together in cascade with a return wire. The inlet of the NAND 246 is connected to the outlet of the NAND 247 and to an inlet terminal 248 for the "general reset" signals and to an inlet terminal 249 for the signals transmitted by the decoder along the path 21''' which inform the reader control that the number indicating the address of the block selected has been read. The inlet of the NAND 247 is connected to the outlet of the NAND 246 and to the outlet of the NAND 240 of the memory 238, thus forming the connection between the memories 238 and 239. A condenser 250 connected between the outlets of the NAND 246 and 247 filters any disturbances. The outlet of the memory 239 corresponds to the outlet of the NAND 247 included in it.

The function of the group of memories described is to furnish signals indicating the state of the programmer and the controls imparted to it both by the tape and manually, to a group 251 which, on the basis of these signals and under the control of the oscillator 27 of FIG. 2, furnishes control or arrest signals to a circuit block 252 which controls in its turn a further two circuit blocks in parallel 253 and 254 at the outlets of which there are the signals 8' and 29 of advancement of the tape and reading by the reader 1.

The group indicated by the reference numeral 251 comprises two NAND 255 and 256 which receive at their inlet a signal in the form of a square wave leaving a NAND 257, any one of whose inlets 259, 260 and 261 being connected to the outlet of the oscillator 27. The inlet of the NAND 255 is connected to the outlet of the NAND 257 and to the outlet of the memory 239 in such a manner as to compare the relative signals and furnish the signal obtained by this comparison to one inlet of a NAND 258, the other inlet of which receiving the signal leaving the NAND 256. This latter has a first inlet connected, as stated, to the outlet of the NAND 257, a second inlet connected to a terminal 262 connected in its turn to the outlet terminal 221 of the memory 211, a further inlet connected to an inlet terminal 263 for the signals 37 leaving the "wait executed" block 25 shown in FIG. 2, a fourth inlet connected to an inlet terminal 264 for the signals 32 leaving the "alarm" block 33 of FIG. 2 and a fifth inlet connected by way of a diode 265 to an inlet terminal 266 for the signals 34 leaving the "timed wait" block 35 of FIG. 2 and by way of a diode 267 to a terminal 268 connected in its turn to the outlet terminal 228 of the memory 223.

The outlet of the group 251 consists of the outlet of the NAND 258, which is connected to the inlet of the circuit block 252, namely to the inlet of two NAND 269 and 270, to a further inlet of each of which is connected the outlet of the block 252, namely a NAND 271, one inlet of which is connected to the outlet of the NAND 270 while another of its inlets is connected by way of an inverter 272 to the outlet of the NAND 269, said outlet being further connected to earth by way of a condenser 273 which provided the group 252 with particular characteristics of wave form variation which will appear evident hereinafter.

The outlet of the circuit block 252 is connected to the inlets of the blocks 253 and 254. The first comprises two NAND 274 and 275, which have one inlet connected to the outlet of the block 252 and another inlet connected to the outlet of a NAND 276 having one inlet connected to the outlet of the NAND 274 and one inlet connected by way of an inverter 277 to the outlet of the NAND 275, this latter outlet being further connected to earth by way of a condenser 278 which is of a greater capacity than that of the condenser 273 previously mentioned, and which furnishes the group 253 with particular characteristics of wave form variation which will also appear evident hereinafter. The outlet of the NAND 276 is connected by way of an inverter 279 to a terminal 288 from which the signals 8' are taken which control the advancement of the tape.

The block 254 consists of two inverters 281 and 282 connected in cascade and a condenser 283 of much smaller capacity than the capacities of the condensers 273 and 278 previously mentioned, connected between earth and the connecting wire of the two inverters. The inlet of the inverter 281 is connected to the outlet of the block 252. The outlet of the inverter 282 is connected to a terminal 284 from which the signals 29 are taken which control by way of the time switch 30 the reading of the tape by the reader.

In order to describe the operation of the block shown in FIG. 7 it is necessary first of all to suppose that the various signals applied to its inlets are always at logic level "1" in the rest condition and are brought to the logic level "0" only at the moment of control (or blocking if dealing with an alarm, wait executed or stop tape signal) of the advancement of the tape and its reading. Exceptions to this rule are the signals applied to the inlets 259, 260 and 261, which as they come from unstable oscillators, oscillate rhythmically between the logic levels "1" and "0."

It will be supposed that a working cycle is to be commenced and the electric supply to the machine is not yet switched on. Switching the supply on causes short "general reset" signals to be applied to the various blocks of the programmer, the function of which is to put the blocks into the starting positions. These signals (at logic level "0" according to that which has been previously stated) are applied also to the inlets 203, 242 and 248 of the "reader control" block shown in FIG. 7. The signal "0" applied to the inlet 203 makes the outlet 209 of the memory 200 become "1" and the outlet 208 of the memory 200 become "0." The presence of the feedback wire which connects the outlet of the NAND 202 to the inlet of the NAND 201 makes this situation remain even on the successive return to "1" of the signal applied to the terminal 203. As the outlet 208 of the memory 200 is at logic level "0," the outlet 220 of the memory 211 is at logic level "1" and the outlet 221 of the memory 211 is at logic level "0." Analogously the outlet 228 of the memory 223 and the outlet 236 of the memory 230 are at logic level "0." The signal "0" of "general reset" applied to the inlet 242 of the memory 238 makes the outlet of the memory 238 go to "1," and it maintains it because of the effect of the feedback between the outlet of the NAND 241 and the inlet of the NAND 240, and hence the outlet of the memory 239 to "0," because of the simultaneously application of another "0" signal of "-general reset" to the inlet 248 of the memory 239, this situation remaining even after the return to "1" of the inlet 248 because of the effect of the presence of the feedback wire between the outlet of the NAND 247 and the inlet of the NAND 246.

Having examined the state of the memories 200, 211, 223, 230, 238 and 239 after putting the machine under tension, the state of the control block 251 and the blocks 252, 253, and 254, controlled by it will now be examined. To the inlets of the NAND 256 are applied a signal which varies rhythmically between "0" and "1" as the signal coming from the oscillator and applied to one of the inlets 259, 260 and 261 varies between "1" and "0," a signal "0" applied to the terminal 221 of the memory 211, a signal "1" applied to the terminal 263 and signifying the absence of calls of "wait executed," a signal "1" applied to the terminal 264 and signifying the absence of signals of "alarm" (it is supposed in fact that the machine has been arranged in the suitable manner before connecting it to the supply) a signal "1" applied to the terminal 266 and signifying the absence of calls of "timed wait" finally a signal "0" applied to the terminal 268 connected to the terminal 228 of the memory 223. The presence of signals "0" at its inlets makes the outlet of the NAND 256 be maintained at "1" as the logic levels of the signals transmitted by the oscillator vary, so that a signal "1" is always applied to a first inlet of the NAND 258 under these conditions. On the other hand if the outlet of the memory 239 is permanently at "0," then the second inlet of the NAND 258 remains at "1," independently of variations in the signals transmitted by the oscillator, so that the outlet of the NAND and hence off the block 251 is in this situation permanently "0."

The permanence at "0" of the outlet of the block 251 means that at one of the inlets of the NAND 269 of the block 252 there is a "0" present, which by way of the NAND 269, the condenser (charge) 273, the inverter 272 and the NAND 271, causes the outlet of the block 252 to be maintained at "1," and hence by way of the NAND 274 and 275, the condenser (discharge) 278, the inverter 277, the NAND 276 and the inverter 279, maintains the outlet of the block 253 at "0," and by way of the inverter 281, the condenser (discharge) 283 and the inverter 282, maintains the outlet of the block 254 at "1."

Supposing that there is a "1" at the terminal 280 for the advancement of the tape and a "0" at the terminal 284 for its reading, in this condition the tape is at rest and the reading is not activated.

If now the preselection button is pushed, a signal 14' arrives at the inlets 206, 219, 227, 233 and 244. The first makes the outlet 208 and 209 of the memory 200 switch to "1" and "0" respectively, the second maintains the memory 211 in its previous state, the third switches the outlet 228 of the memory 223 to "1," the fourth maintains the memory 230 in its previous state (the decoder 20 is thus ready for reading only the address of the preselected block), and the fifth switches the memory 238 and the consequent switching of the memory 239, so that a signal "1" is applied to the inlet of the NAND 255 which is connected to the outlet of the memory 259. This situation remains even after the successive return to "1" of the signal 14' (the control signals of the block in FIG. 7 are in face supposed to be constituted of short impulses from "1" to "0" and then immediately followed by "1") because of the effect of the memory properties of the blocks 200, 211, 223, 230, 238 and 239.

Because of the switching to "1" of the outlet 228 of the memory 223, the inlet 268 of the NAND 256 also goes to "1," but said NAND 256 is not switched because the outlet 221 of the memory 211 is maintained at "0," together with the inlet 262 of the NAND 256. The switching of the memory 239 gives rise to a "1" at the inlets of the NAND 255, from the memory 239 and a "0" or alternatively a "1" according to the state of the outlet of the NAND 257 and thus according to the state of the oscillator connected to the inlet terminals 259, 260 and 261. Because of this, at the inlet of the NAND 258 there is a "1" from the outlet of the NAND 256 and a "1" or alternatively a "0" from the outlet of the NAND 255. Correspondingly the outlet of the NAND 258 and hence of the entire group 251 varies from "0" to "1" and from "1" to "0" at a constant rate determined by the oscillator which feeds the group shown in FIG. 7.

As shown in FIGS. 8a–8e, each time the outlet of the group 251, which will be defined hereinafter as $U_{251}$, passes from "0" to "1" (FIG. 8a) the condenser 273 discharges across the inverter 272 (FIG. 8b) the outlet of which (FIG. 8c) switches more or less instantaneously to "1" (it can in fact be supposed that the discharge of the condenser 273 is very rapid. If it was slow, the switching of the outlet of the inverter would be late with respect to the switching of the outlet of the NAND 269). As at the same time the outlet of the NAND 270 (FIG. 8*d*) is also switched, at the inlets of the NAND 271 a signal "1" is still applied (signal $I''_{271}$ corresponding to the outlet of the inverter 272) and a signal "0" (signal $I'_{271}$ corresponding to the outlet of the NAND 270) because of which its outlet $U_{271}$ remains at the logic level "1" (FIG. 8*e*) even though the outlet $U_{251}$ of the complex 251 is switched.

This situation remains unaltered until the successive switching to "0" of $U''_{251}$, when $I''_{271}$ switches to "1" and two signals of logic level "1" are applied to the inlet of the NAND 271. The outlet $U_{271}$ then goes to "0" (FIG. 8e). The switching to "0" of $U_{251}$ has however provoked the beginning of charging of the condenser 273 (FIG. 8*b*), with a time constant determined by its capacity (for example 10 $\mu$F). When the charge of the condenser 273 attains a level such as to provide a voltage $I_{272}$ at the inlet of the inverter 272 greater than the threshold voltage of the inverter, this latter switches (FIG. 8*c*) making $I'_{271}$ go to "0" and making the outlet $U_{271}$ switch to "1" (FIG. 8*e*).

The return to "1" of $U_{251}$ allows the condenser 273 to discharge but it does not make the logic level of $U_{271}$ vary, which remains at "1" until the successive return to "0" of $U_{251}$ and then returns to "1" when the successive recharging of the condenser 273 makes the outlet of the inverter 272 switch again to "0."

The outlet $U_{271}$ of the NAND 271 and hence of the entire block 252 has thus the form shown in FIG. 8*e*, and this is maintained constantly at level "1" with the exception of impulses at level "0" which have a frequency equal to that of the outlet $U_{251}$, which are in phase with it and have a duration which depends on the charge constant of the condenser 273 and the threshold voltage of the inverter 272. This signal form at the outlet of the block 252, which functions practically as a wave form variator, is reflected in the form of the outlet signals of the blocks 253 and 254, i.e., of the signals available at the outlets 280 and 284 (as has been said, "0" and "1" respectively in the rest conditions).

Figure 9:
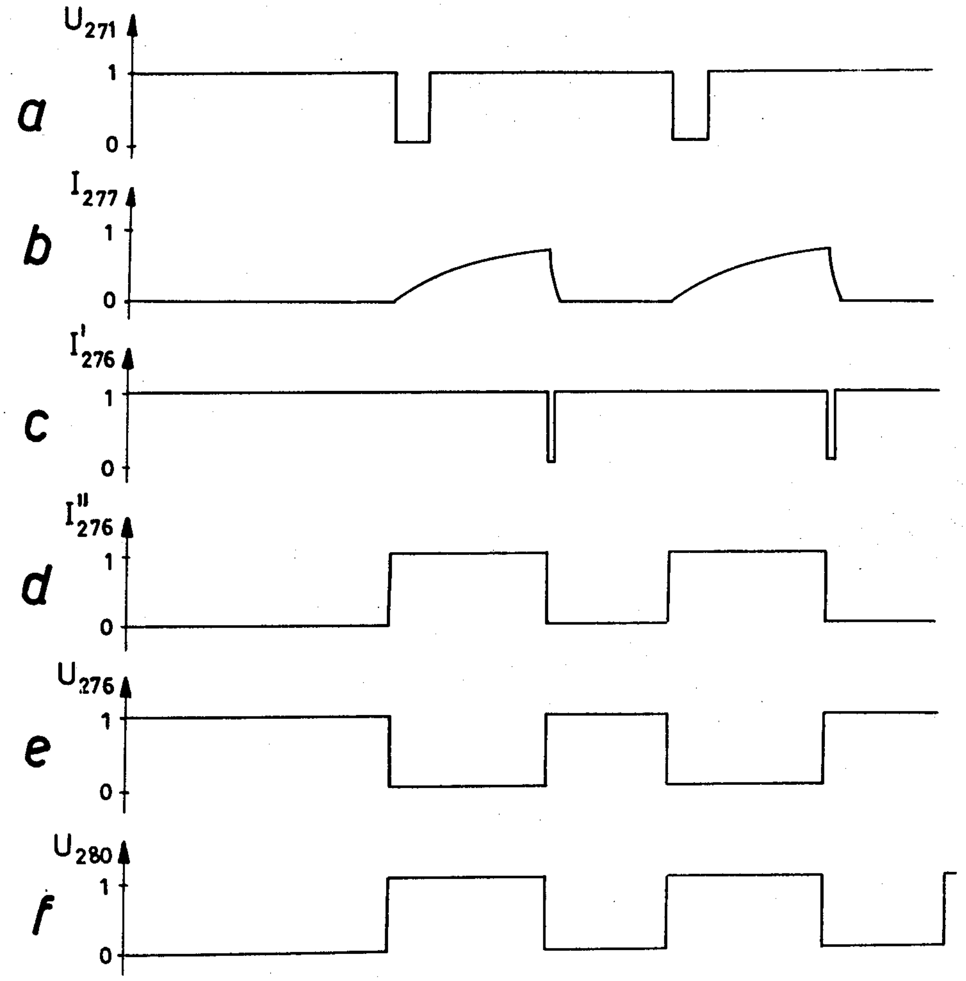

Examining initially the block 253, it can be seen (FIGS. 9*a*–9*f*) that each time the outlet $U_{271}$ passes from "1" to "0" (FIG. 9a), the outlet $U_{276}$ of the NAND 276 also goes to "0" (FIG. 9e) because of the effect of switching (FIG. 9b) the outlet of the NAND 274 (inlet $I''_{276}$ of the NAND 276), because of which the outlet $U_{280}$ of the block 253 goes to "1" (FIG. 9f), making the tape advance. At the same time the condenser 278 begins to charge (FIG. 9b) with a charge constant depending on the value of the capacity of the condenser (for example 33 $\mu$F). When the charge across the condenser 278 reaches a value such that the threshold value of the inverter 277 exceeds the inverter inlet voltage ($I_{277}$) (comparing FIGS. 9*a* and 9*b*, it is seen that this takes place after the return to "1" of $U_{271}$, as the capacity of the condenser 278 and the threshold voltage of the inverter 276 are large enough), the outlet $I_{276}$ of this latter switches to "0" (FIG. 9*c*), because of which $U_{276}$ switches to "1" (FIG. 9*e*) and $U_{280}$ switches to "0" (FIG. 9*f*), thus blocking the advancement of the tape. The switching to "1" of $U_{276}$ however makes the condenser 278 discharge rapidly with consequent immediate return to "1" of $I'_{276}$ (FIG. 9*c*), while $I''_{276}$ also returns to "0" making $U_{276}$ be maintained at "1" and hence $U_{280}$ be maintained at "0." The switching of $U_{276}$ and $U_{280}$ takes place on the successive return to "0" of $U_{271}$, i.e., when $I''_{276}$ goes to "1" and, combining itself with the level "1" of $I'_{276}$, causes $U_{276}$ to switch to "0" and consequently $U_{280}$ to switch to "1," by which means the tape begins to move again.

The wave form of the outlet $U_{280}$ of the block 253 thus consists (FIG. 9*f*) of a succession of positive impulses (of advancement) which are repeated with a frequency equal to that of $U_{271}$ and hence of $U_{251}$. They are in phase with these signals and their duration depends on the charge constant of the condenser 278 and of the threshold voltage of the inverter 276.

Figure 10:
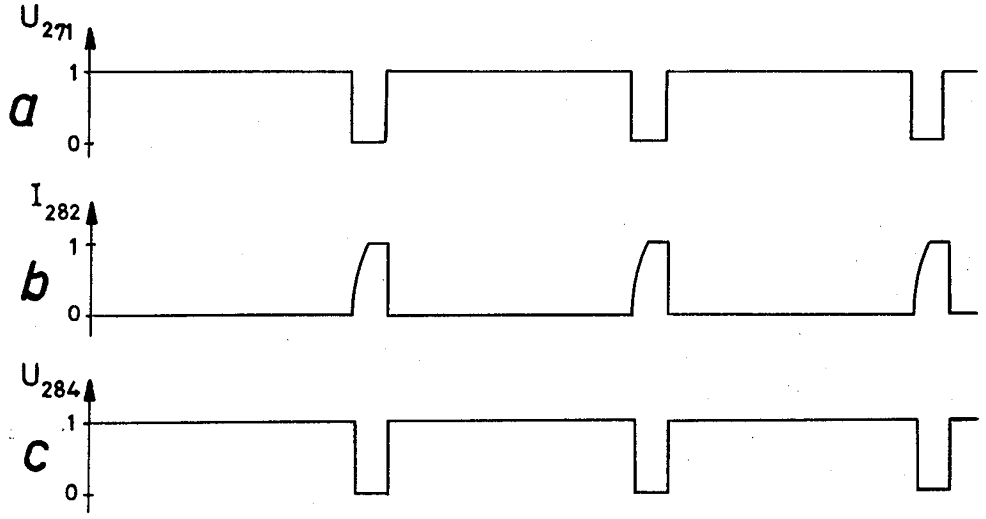

With reference to the block 254, it can be seen from FIGS. 10*a*–10*c* that each time $U_{271}$ goes to "0," the condenser 283 begins to charge with a time constant depending on its capacity and hence very rapidly, it having been supposed that the capacity of the condenser 283 is very small with respect to that of condensers 273 and 278 (for example 10 KpF); consequently the switching to "0" of $U_{284}$ (with the consequent emission of a reading signal) is more or less simultaneous with the switching to "0" of $U_{271}$. When $U_{271}$ returns to "1," the condenser 283 discharges very rapidly making $U_{284}$ go immediately to "1."

Comparing the forms of $U_{280}$ (FIG. 9*f*) and $U_{284}$ (FIG. 10*c*) it is seen that the order to read is very short and is imparted to the reader more or less simultaneously with that of advancement. This apparently strange fact is justified in that the means which make the tape advance are mechanical and hence have inertia while the reading means are normally of the electronic type and thus have a very rapid response, because of which each piece of information is read before the tape begins effectively to advance in order to reach the next reading position.

Summarizing the foregoing with regard to the operation of the block shown in FIG. 7 if the preselection button is pushed, the oscillations of the oscillator connected to one of the terminals 259, 260, and 261 produce a rhythmic succession of advancements and readings of the tape. However as the signal present at the outlet terminal 236 of the memory 230 has set the decoder 20 such that it blocks all the information read with exception of that relative to the address of the preselected block, these readings will not have any influence on the state of the other parts of the programmer and in particular on the state of the peripheral units and hence on the movable members of the machine.

This succession of advancements and readings continues until the reader reads the reading relative to the address of the preselected block (an N in the previously supposed case in which the block addresses are formed by coupling a letter N with a number). The reading of this letter, which takes place at the beginning of an advancement of the tape towards the following reading position, causes the application at the terminals 235 and 243 of the memories 230 and 238 of a short signal "0" (coming from the decoder 20 along the path 22''''') which causes the switching of the memory 230 with consequent passage to "1" of the outlet 236 and the switching of the memory 243 with consequent passage to "1" of its outlet connected to one of the inlets of the NAND 247 of the memory 239. This latter however does not change state, because of which the advancement and reading of the tape proceed until the reading of the number which, coupled to the letter N previously read, defines the address of the preselected block. At this point the decoder sends a short signal "0" to the reader control along the path 21''', which applied to the inlet 249 of the memory 239 causes its switching and the consequent application of a signal "0" (permanent, because of the memorising properties of the block 239) to one of the inlets of the NAND 255. Its outlet is consequently maintained at "1" and as the outlet of the NAND 256 is also fixed at "1" the outlet of the NAND 258 is maintained at "0" so blocking both the advancement and reading of the tape (levels "0" and "1" at the outlets 280 and 284 respectively).

With the programmer thus set for the beginning of a determined operational block, its operation in "automatic" is begun by operating the "automatic" push button of the block 15 in FIGS. 1 and 2. A short signal 14'' of logic level "0" appears then at the inlets 207 and 214 of the memories 200 and 211. The one applied to the inlet 207 does not cause any change in the state of the memory 200, while that applied to the inlet 214 switches the memory 211 with consequent passage to "0" of the outlet 220 and to "1" of the outlet 221. Because of the effect of the connection between the terminals 221 and 262 the NAND 256 then unblocks and begins to furnish at its outlet alternating levels "1" and "0" as a function of the alternating state of levels "0" and "1" at the outlet of the NAND 257 and levels "1" and "0" at the inlets 259, 260 and 261. Correspondingly the outlet of the NAND 258 (the outlet $U_{251}$ previously examined with reference to FIGS. 8–8a) again oscillates between "0" and "1," thus making the succession of advancements and readings previously described recommence.

As the outlet 236 of the memory 230 is now "1," the decoder is unblocked and can now send the information which it receives to the various peripheral units concerned. The various movable members of the machine concerned with this information then carry out the functions required making the machine perform the desired operations. As stated previously with reference to FIG. 2, the tape does not only contain information intended for the peripheral units, but also information intended for the peripheral units, but also information intended for the reader control such as the wait executed calls ?, the timed wait calls T̲ and the stop tape calls /̲.

The wait executed calls are sent along the path 22''' to the wait executed block 25 (FIG. 2) where they cause the emission of a signal of logic level "0" which, arriving at the inlet 263 of the NAND 256, blocks this latter and hence blocks the advancements and readings of the tape; this block signal disappears (as will be better seen hereinafter) on the arrival of the executed signal or signals for which the block 25 is waiting.

The timed wait calls are sent along the path 22''''' to the block 35 of FIG. 2, where, combining with the signals 28 from the memory 24, give rise to the emission of a signal of logic level "0" which, arriving at the inlet 266 of the NAND 256, causes this latter to block for its whole duration.

The stop tape calls arrive directly at the reader control, mainly at the inlet 215 of the memory 211. As these stop tape calls consist of signals of logic level "0," they cause the memory 211 to switch with consequent blocking of the NAND 256 (remembering that the terminals 221 and 262 are connected) and the consequent presence, at the outlet 220 of the memory 211, of a signal "1" authorizing the manual controls included in the block 16 of FIG. 2 (or rather of only a part of these manual controls, as already previously stated). Because of the memory properties of the block 211, the successive annulment of these stop tape signals is not sufficient to allow the recommencing of advancements and readings of the tape, because of which it is necessary to repress the automatic push button of the block 15 of FIG. 2. The presence of a "0" at the inlet 214 of the memory 211 returns the memory to its previous state, because of which the level "1" at the outlet 221 unblocks the NAND 256 while the level "0" at the outlet 220 deauthorizes the manual controls of the block 16 of FIG. 2. As previously stated, the recommencement of advancements and readings of the tape is not dependent on a new preselection of block address (which is at the same time the cause and effect of the only partial authorization of the manual controls of said block 16).

The stopping of the tape can be caused not only by a stop tape call but also by an alarm signal of level "0" arriving at the terminal 264 coming from the block 33 of FIG. 2, or by a signal 14''' of "tape arrest" or 14'''' of "manual" (of level "0") from the corresponding push buttons in block 15. The signals 14''' when at level "0" cause the memory 211 to switch and thus have the same effect as the stop tape calls, while the signals 14'''' arriving at the inlet 204 of the memory 200, cause it to switch and hence because of the connection between the terminals 208, 217 and 226, also the switching of the memories 211 and 223 and the consequent blocking of the NAND 256. Also the switching to "1" of the outlets 209 and 220 permits the authorization of all the manual controls of the block 16 of FIG. 2, the signal "1" at the outlet 209 authorizing all those manual controls not associated with the signal "1" at the outlet 220. In order to recommence automatic operation it is necessary however in this case to make a new preselection of block address, the simple return to "1" of the preceding signal "0" at the inlet 204 not in fact being sufficient to return the memories 200, 211 and 223 to their original state.

With the peripheral unit of FIG. 3, the positioning unit shown in FIGS. 4–6 and the reader control shown in FIGS. 7–10, some preferred embodiments of some of the most typical and characteristic component parts of the programmer shown in its most general lines in FIG. 1 and in more detailed form in FIG. 2 have been illustrated and described. However these embodiments can undergo numerous variations while leaving the functions carried out by them substantially unaltered.

As regards the other blocks shown in FIG. 2 and neither described nor illustrated here in detail, these can assume various but conventional configurations, because of which it is considered that their detailed description can add nothing to the fundamental characteristics of the invention, as summarised in the following claims.

The embodiments of the invention in which an exclusive property or privilege is claimed are defined as follows:

1. A tape programmer for operating machines of various types, in particular operational machines and test machines, comprising: a reader for sensing and transmitting information contained on the tape, movable members, a plurality of actuators, a like plurality of peripheral units coupled to said movable members and to said actuators for furnishing to said actuators signals for operating the movable members of the machine, first and second manual controls, and central unit means operatively coupled to said first and second manual controls, to said reader and to said peripheral units for receiving, decoding and sending to the peripheral units portions of the information transmitted by the reader, and for controlling the advancement and arrest of the tape as a function of the information transmitted by the reader, information transmitted by the peripheral units relative to the state of the movable members connected to them and information transmitted to said central unit means by said first manual controls and finally authorizing second manual controls following reception of other information transmitted by the reader or some of the information transmitted by said first manual controls.

2. A programmer as claimed in claim 1, further including reader control means for controlling at a constant rate the advancement and reading of the tape and wherein said central unit comprises decoder means for receiving the information transmitted by the reader, decoding said information and sorting it into a plurality of channels, selected ones of said channels coupled to carry to the peripheral units the information relative to changes of state of the members of the machine and others of said channels coupled to carry information relative to the arrest of said reader control means.

3. A programmer as claimed in claim 2, in which at least one of said other channels comprises "wait executed" circuit means operatively coupled for receiving at its inlet the information sent to said last-mentioned other channel by the decoder and the information transmitted by at least some of the peripheral units in order to notify that orders previously imparted to said last-mentioned peripheral units have been carried out, and wherein the signal leaving said "wait executed" circuit means blocks the means should the presence of information transmitted by the decoder means not be corresponded to by the simultaneous presence of information transmitted by the peripheral unit which operates the machine member to which said information refers.

4. A programmer as claimed in claim 2, in which at least one other of said other channels comprises "timed wait" circuit means for, on receiving "timed wait" information sent on said last-mentioned channel by the decoder means, emitting a signal for blocking the means, said signal having a duration determined by further information coupled to said "timed wait" information.

5. A programmer as claimed in claim 2, in which at least a further one of said other channels is coupled to carry arrest information for the means, of unlimited duration, directly to the means.

6. A programmer as claimed in claim 5, in which said arrest information, termed "stop tape," is coupled to cause in addition to the arrest of the means, also the authorization of a part of the second manual controls.

7. A programmer as claimed in claim 6, in which said second manual controls are operatively coupled to permit the manual control of the movements and variations of physical state of the members of the machine.

8. A programmer as claimed in claim 5, in which the arrest of the means is caused also by "alarm" signals emitted by the peripheral units when dangerous conditions arise.

9. A programmer as claimed in claim 8, further including an alarm circuit coupled for enabling said alarm signals to act on the means.

10. A programmer as claimed in claim 5, wherein the first and second manual controls are coupled for enabling the arrest of the means by causing the operation of two of the first manual controls, one of them (called "arrest tape") and also by causing the authorization of a part of said second manual controls, the other (called "manual") also causing the authorization of all of said second manual controls.

11. A programmer as claimed in claim 10, in which said first manual controls also comprise at least one other control means, called "preselection" means, coupled for causing the unblocking of the means and the advancement of the tape to a new predetermined arrest position, said "preselection" means also coupled for causing the blocking of the decoder means in such a condition as to block all the information read off the tape with the exception of a predetermined piece of information the reading of which causes the arrest of the means.

12. A programmer as claimed in claim 10, in which said first manual controls also comprise a further control means, called "start working" means, in operative relationship for causing the unblocking of the means and the recommencement of advancement and reading of the tape from the point at which the tape had been previously stopped.

13. A programmer as claimed in claim 12, in which the operation of said "start working" means is ineffective if it is not preceded by the operation of the "-preselection" means, when the blocking of the means has been caused by operation of the controls.

14. A programmer as claimed in claim 12, in which the operation of said "start working" means is ineffective if it is not preceded by the operation of the "-preselection" means when the blocking of the means has been caused by an "alarm" signal.

15. A programmer as claimed in claim 1, further including limit switches and elements disposed on the machine and wherein each peripheral unit comprises a complex in two stable states, a first stable state corresponding to the deactivation and the second corresponding to the activation of the respective actuator, the switching from the first to the second stable state being caused by information transmitted by the central unit means, or by information transmitted by said second manual controls, the switching from the second to the first stable state being caused by information transmitted by the central unit means, by information transmitted by said second manual controls, by signals coming from said limit switches disposed on the machine for defining the range of variability of the position or physical state of the controlled member or by signals transmitted by other peripheral units or by said elements disposed on the machine for notifying the presence of interference between the various members of the machine.

16. A programmer as claimed in claim 15, in which each peripheral unit comprises an inlet part acting as a memory element and an outlet part acting as a power switch.

17. A programmer as claimed in claim 15, further including forward and backward movement actuators connected to each of said peripheral units and a positioning unit connected to said forward and backward actuators, wherein the peripheral units relative to one member of the machine to be positioned in at least one intermediate position between two extreme positions are connected by their respective forward and backward movement actuators to the outlet of said positioning unit which receives the information transmitted by the central unit means or by said second manual controls and transmits control signals to the one or other of said peripheral units according to whether the movable controlled member is located forward or backward of the controlled position.

18. A programmer as claimed in claim 17, in which said positioning unit is operatively coupled to assume in succession a plurality of different stable states, each of which corresponds to a position of the controlled movable member between two different intermediate and extreme positions, the switching from one stable state to the other being controlled by said elements, disposed on the machine, which are sensitive to the passage of the controlled member, said positioning unit further having a plurality of inlets for the information transmitted by the central unit means, each of said inlets corresponding to one of the extreme or intermediate controlled positions, said positioning unit further having two outlets, one for the peripheral unit for forward movement and one for the peripheral unit for backward movement, which are activated alternatively following activation of one of said inlets according to whether the activated inlet is one relative to a position situated forward of that corresponding to the stable state in which the machine exists in that moment, or vice versa, the arrival of the controlled movable member in a position corresponding to the sensitive element relative to the controlled position causing the deactivation of the active peripheral unit.

19. A programmer as claimed in claim 1, comprising a further peripheral unit operatively coupled for receiving and memorizing information of the digital type read off tape, said information referring to positioning levels of a controlled member compared with the instantaneous effective levels of the controlled member such that their different controls said controlled member until it reaches a position corresponding to the annulment of said difference.

20. A programmer as claimed in claim 11, for use with a punched tape in which the information is gathered in groups each provided with its own address which can be selected by means of operation of said means.

21. A programmer as claimed in claim 18, in which each piece of said information comprises at least two successive perforations, the result of the reading of the first perforation being memorized at the outlet of the decoder means and at the inlet of the peripheral unit or of the positioning unit concerned, in such a manner that at the arrival of the result of the reading of the second perforation, a pair of signals is formed which represents the information which causes the activation or deactivation of said peripheral unit or said positioning unit.

* * * * *